US012533276B2

(12) United States Patent
Fox et al.

(10) Patent No.: US 12,533,276 B2
(45) Date of Patent: Jan. 27, 2026

(54) DEVICE FOR ROTATING A PATIENT ON A SURFACE OF A BED

(71) Applicant: SENECA DEVICES, INC., Durham, NC (US)

(72) Inventors: Samuel T. Fox, Durham, NC (US); Deborah Lange, Durham, NC (US); Nicholas Ponder, Raleigh, NC (US)

(73) Assignee: Seneca Devices, Inc., Durham, NC (US)

( * ) Notice: Subject to any disclaimer, the term of this patent is extended or adjusted under 35 U.S.C. 154(b) by 98 days.

(21) Appl. No.: 18/399,938

(22) Filed: Dec. 29, 2023

(65) Prior Publication Data

US 2024/0216201 A1 Jul. 4, 2024

Related U.S. Application Data

(60) Provisional application No. 63/435,940, filed on Dec. 29, 2022.

(51) Int. Cl.

| | |
|---|---|
| ***A61G 7/10*** | (2006.01) |
| ***A61G 5/10*** | (2006.01) |
| ***A61G 7/057*** | (2006.01) |

(52) U.S. Cl.

CPC ............. *A61G 7/1076* (2013.01); *A61G 5/10* (2013.01); *A61G 7/057* (2013.01); *A61G 7/1026* (2013.01); *A61G 7/1084* (2013.01); *A61G 7/1098* (2013.01)

(58) Field of Classification Search

None

See application file for complete search history.

(56) References Cited

U.S. PATENT DOCUMENTS

| | | | |
|---|---|---|---|
| 3,871,036 | A | 3/1975 | Attenburrow |
| 4,941,221 | A | 7/1990 | Kanzler |
| 4,979,249 | A | 12/1990 | Meade, II |
| 5,020,171 | A | 6/1991 | Dimatteo et al. |
| 5,651,149 | A | 7/1997 | Garman |

(Continued)

FOREIGN PATENT DOCUMENTS

| | | |
|---|---|---|
| DE | 3514040 A1 | 10/1986 |

OTHER PUBLICATIONS

International Search Report and Written Opinion, issued by the International Searching Authority (ISA/US) in PCT Application No. PCT/US2020/019211 on Jul. 1, 2020. 13 pages.

(Continued)

*Primary Examiner* — Adam C Ortiz

(74) *Attorney, Agent, or Firm* — Robinson IP Law, PLLC

(57) ABSTRACT

Various other implementations include a device for rotating a patient. The device includes a bottom sheet and a top sheet. The bottom sheet is configured to abut a surface of a bed in use. An intermediate line of the bottom sheet extending from a head edge to a foot edge is disposed between its side edges. An intermediate line of the top sheet extending from the head edge to the foot edge is disposed between its side edges. The intermediate line of the top sheet is coupled to the intermediate line of the bottom sheet to couple the top sheet to the bottom sheet. The top sheet includes at least one first fastener coupled adjacent to its first edge and at least one second fastener coupled adjacent to its second edge. The at least one first fastener is couplable to the at least one second fastener.

19 Claims, 30 Drawing Sheets

(56) References Cited

U.S. PATENT DOCUMENTS

| | | | | |
|---|---|---|---|---|
| 7,090,647 | B2 | 8/2006 | Mimura et al. | |
| 8,453,276 | B2 | 6/2013 | Hillenbrand, II | |
| 9,003,578 | B2 | 4/2015 | Hillenbrand, II | |
| 9,205,012 | B2 | 12/2015 | Hillenbrand, II et al. | |
| 10,258,525 | B2 | 4/2019 | Hillenbrand, II et al. | |
| 12,220,366 | B2 * | 2/2025 | Rigoni | A61G 7/05715 |
| 2001/0044957 | A1 | 11/2001 | Hodgetts | |
| 2005/0138727 | A1 | 6/2005 | Faux et al. | |
| 2006/0053698 | A1 | 3/2006 | Minning et al. | |
| 2013/0270881 | A1 | 10/2013 | Fowler et al. | |
| 2014/0259389 | A1 | 9/2014 | Hillenbrand, II et al. | |
| 2016/0331617 | A1 | 11/2016 | Stryker et al. | |
| 2016/0374883 | A1 * | 12/2016 | Galbraith | A61G 7/1073<br>5/81.1 T |
| 2020/0330305 | A1 * | 10/2020 | Leiker | A61G 7/1042 |
| 2021/0228428 | A1 * | 7/2021 | Spahn | A61G 7/1026 |
| 2021/0322241 | A1 | 10/2021 | Stryker et al. | |
| 2022/0000690 | A1 | 1/2022 | Fox et al. | |
| 2022/0323283 | A1 * | 10/2022 | Boulos | A61G 13/1275 |

OTHER PUBLICATIONS

European Patent Office. Extended European Search Report. Issued in EP Application No. 20759394.8.dated Oct. 10, 2022 from corresponding European Patent Application No. 20759394.8. 7 pages.

International Search Report and Written Opinion in relation to PCT/US2023/067647, mailed on Oct. 24, 2023 (16 pages).

* cited by examiner

DEVICE FOR ROTATING A PATIENT ON A SURFACE OF A BED

BACKGROUND

Patients who are confined to a bed must also be laterally turned on a regular basis to prevent bed sores and allow the caregiver to access the patient's back side for hygiene, skin assessment, and wound care procedures, as well as the placement of devices including transfer slings, sheets, towels, and bedpans. Because of the height or width of some patients and the narrowness of some beds, some patients laying in the supine position in the center of a bed do not have enough space to be fully turned on the patient's side in a comfortable manner that allows the caregiver access to the patient's back side. For the same reasons discussed above with respect to moving a patient toward the head end of the bed, both moving the patient laterally on the bed and turning the patient onto the patient's side can be very difficult for the assisting person.

Turning a patient in a bed becomes even more difficult when turning the patient a full 180 degrees from a supine position to a prone position, or vice versa. The limited width of a standard hospital bed does not provide enough distance to either side of an average patient laying in the center of the mattress to roll 180 degrees before contacting the side rails of the bed. This problem is exacerbated when the person in the bed is obese because the person will have less distance to either side of the person and will move a longer distance when rolling 180 degrees.

Currently, to turn a person 180 degrees in a hospital bed, multiple caregivers must perform a series of manually shifting the patient to one side of the bed, manually turning the patient toward the opposite side of the bed, and repeating these steps until the patient has turned a full 180 degrees. Other current methods of turning a patient 180 degrees in a bed include lowering a side rail of the bed, abutting another structure such as a stretcher against the lowered side rail, manually shifting the patient onto the abutting structure, and then manually rolling the patient back onto the bed. However, both of these currently used methods involve multiple caregivers providing manual movement of the patient.

Thus, a need exists for a method of turning a person 180 degrees in a bed that limits the physical force involved from the assisting person.

SUMMARY

Various other implementations include a device for rotating a patient. The device includes a bottom sheet and a top sheet. The bottom sheet is configured to abut a surface of a bed in use. The bottom sheet has a bottom first edge, a bottom second edge opposite and spaced apart from the bottom first edge, a bottom head edge extending between the bottom first edge and the bottom second edge, a bottom foot edge opposite and spaced apart from the bottom head edge, and a bottom intermediate line extending from the bottom head edge to the bottom foot edge. The bottom intermediate line is disposed between the bottom first side edge and the bottom second side edge. The top sheet is configured to support the patient in use. The top sheet has a top first edge, a top second edge opposite and spaced apart from the top first edge, a top head edge extending between the top first edge and the top second edge, a top foot edge opposite and spaced apart from the top head edge, and a top intermediate line extending from the top head edge to the top foot edge. The top intermediate line is disposed between the top first side edge and the top second side edge. The top intermediate line is coupled to the bottom intermediate line to couple the top sheet to the bottom sheet. The top sheet includes at least one first fastener coupled adjacent to the top first edge and at least one second fastener coupled adjacent to the top second edge. The at least one first fastener is couplable to the at least one second fastener.

In some implementations, the top sheet is coupled to the bottom sheet only along the top intermediate line and the bottom intermediate line.

In some implementations, the top sheet is sewn to the bottom sheet. In some implementations, the top sheet is radio-frequency welded (RF-welded) to the bottom sheet.

In some implementations, the top intermediate line is a top centerline disposed a substantially equal distance from the top first edge and the top second edge. In some implementations, the bottom intermediate line is a bottom centerline disposed a substantially equal distance from the bottom first edge and the bottom second edge.

In some implementations, the bottom sheet includes at least one side lifter. In some implementations, the at least one side lifter extends adjacent to the bottom first edge. In some implementations, the at least one side lifter includes a webbing strap. In some implementations, the at least one side lifter includes at least two side lifters.

In some implementations, the at least one side lifter is at least one first side lifter. In some implementations, the bottom sheet further includes at least one second side lifter extending adjacent to the bottom second edge. In some implementations, the at least one second side lifter includes at least two second side lifters.

In some implementations, the bottom sheet further includes at least one head lifter. In some implementations, the at least one head lifter includes a zipper.

In some implementations, the bottom sheet further includes at least one foot lifter.

In some implementations, one of the at least one first fastener or the at least one second fastener includes a webbing strap. In some implementations, one of the at least one first fastener or the at least one second fastener is adjustable to change the distance from the one of the at least one first fastener or the at least one second fastener to the top intermediate line. In some implementations, the at least one first fastener or the at least one second fastener each comprise ladder-lock style buckles. In some implementations, the at least one first fastener includes at least two first fasteners and the at least one second fastener includes at least two second fasteners. In some implementations, the at least two first fastener includes at least three first fasteners and the at least two second fastener includes at least three second fasteners.

In some implementations, the top sheet has a first top surface and a second top surface opposite and spaced apart from the first top surface. In some implementations, the second top surface is coupled to the bottom sheet. In some implementations, the at least one first fastener is coupled to the first top surface adjacent the top first edge.

In some implementations, the bottom sheet and the top sheet each includes cotton.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

DETAILED DESCRIPTION

Various implementations include a device for moving a person on a support apparatus with a sheet. The device includes a base, an expandable volume, and a sheet. The base has a first side and a second side opposite and spaced apart from the first side. The base has a support apparatus coupler for coupling the device to a portion of a support apparatus. The expandable volume is disposed on a surface of the base between the first side and the second side. The expandable volume is actuatable from a first position to a second position. The sheet has a first portion and a second portion opposite and spaced apart from the first portion. The second portion is for supporting a patient. The first portion of the sheet is stationary with respect to the base. The sheet extends from the first portion, over the second side, over the expandable volume, and over the first side. Actuation of the expandable volume from the first position to the second position increases a length of the sheet extending from the second side of the base to the first side of the base. Moving the sheet moves the person on the support apparatus.

Various other implementations include a device for moving a person on a support apparatus. The device includes a base and an expandable volume. The base has a first side and a second side opposite and spaced apart from the first side. The base has a support apparatus coupler for coupling the device to a portion of a support apparatus. The expandable volume is disposed on a surface of the base between the first side and the second side. The expandable volume is actuatable from a first position to a second position. Actuation of the expandable volume from the first position to the second position increases a length as measured from the second side, over the expandable volume, to the first side.

Various other implementations include a sheet for use with a device for moving a person on a support apparatus. The sheet includes a main body and a first elastic portion. The main body has a first sheet edge and a second sheet edge spaced apart and opposite from the first sheet edge. The first elastic strip has a first edge and a second edge spaced apart and opposite the first edge. The first elastic strip is resiliently biased toward a relaxed position and urgable to an extended position. The first elastic strip further has a first relaxed width as measured between the first and second edges of the first elastic strip in the relaxed position. The first edge of the first elastic strip is coupled to the first sheet edge and the second edge of the first elastic strip is coupled to a first portion of the main body. A distance between the first sheet edge and the first portion of the main body is greater than the first relaxed width.

Figure 1A:
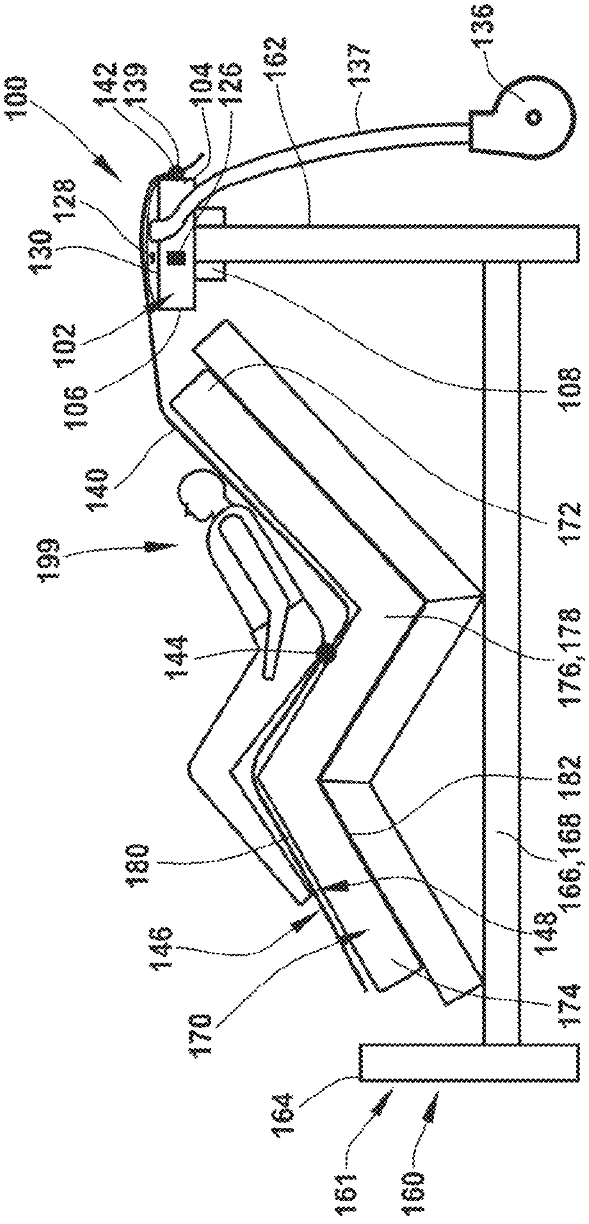
FIGS. 1A and 1B are side views of a device for moving a person on a bed toward the head end of the bed, according to one implementation.
Figure 1B:
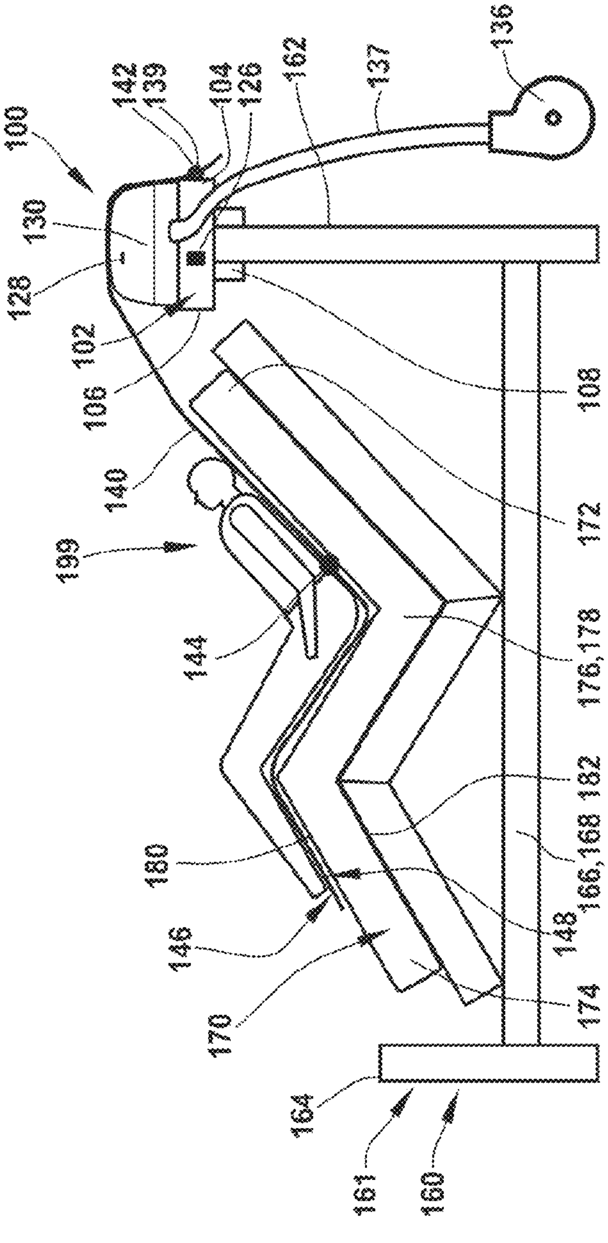

FIGS. 1A and 1B show a device 100 for moving a person 199 on a support apparatus 160. The support apparatus 160 shown in FIGS. 1A and 1B is a bed 160 having bed frame 161 and a mattress 170. However, in other implementations, the support apparatus can be gurney, a stretcher, an operating table, a chair, a wheelchair, or any apparatus on which a person is supported and is prone to move into a less preferred position and would need adjustment. The bed frame 161 has a head end 162, a foot end 164 opposite and spaced apart from the head end 162, and side ends 166, 168. The mattress 170 has a head end 172 for being disposed adjacent the head end 162 of the bed frame 161 and a foot end 174 opposite and spaced apart from the head end 172 of the mattress 170. The mattress 170 also has two side ends 176, 178 each extending from the head end 172 of the mattress 170 to the foot end 174 of the mattress 170. The mattress 170 further has a top surface 180 and a bottom surface 182 opposite and spaced apart from the top surface 180.

The device 100 shown in FIGS. 1A and 1B includes a base 102, an expandable volume 130, and a sheet 140. The base 102 has a first side 104 and a second side 106 opposite and spaced apart from the first side 104. The base 102 shown in FIGS. 1A and 1B is manufactured from a rigid material, but in other implementations, the base is manufactured from a flexible material, such as a woven material or any thin material. In some implementations, the base is a strap. The support apparatus coupler 108 is disposed on the first side 104 of the base 102. The support apparatus coupler 108 couples the device 100 to a portion of the support apparatus 160 such that the device 100 is anchored to the support apparatus 160) and does not move relative to support apparatus 160 when the device 100 is used. The support apparatus coupler 108 shown in FIGS. 1A and 1B includes a pair of clamps for coupling the device 100 to the head end 162 of the bed frame 161, as discussed below. However, in other implementations, the support apparatus coupler includes a sleeve that securely fits over the head end 162 of the bed frame 161, one or more straps that fit around the head end 162 of the bed frame 161, one or more ratcheting straps that fit around the head end 162 of the bed frame 161, one or more hook and loop strips, fasteners, a sewn stitch connecting to the head end 162 of the bed frame 161, a friction coating, an adhesive, or any other coupler capable of keeping the device coupled to the support apparatus when overcoming the forces applied to the device when the device is moving a person on the support apparatus, as discuss in more detail below:

The support apparatus coupler 108 of the device 100 in FIGS. 1A and 1B is coupled to the head end 162 of the bed frame 161. However, in other implementations, the support apparatus coupler is coupled to the foot end of the bed frame, a side end of the bed frame, the head end of the mattress, the foot end of the mattress, a side end of the mattress, or any other portion of either the bed frame or mattress in which direction the sheet is desired to be pulled, as discussed below. In some implementations, the support apparatus coupler is coupled to the bottom surface of a mattress. In some implementations, the device is not coupled to a portion of the support apparatus. In some implementations, the device is integrated into a portion of the support apparatus, such as the bed frame, the mattress, or the wheelchair. In some implementations, the device is disposed between the bottom surface of the mattress and a portion of the bed frame. As mentioned above, in some implementations, the support apparatus can be gurney, a stretcher, an operating table, a chair, a wheelchair, or any apparatus on which a person is supported and is prone to move into a less preferred position and would need adjustment.

The expandable volume 130 acts as a cam to increase the distance as measured from the second side 106 of the base 102, over the expandable volume 130, to the first side 104 of the base 102 when the expandable volume 130 is actuated from a first position to a second position. When the expandable volume 130 is actuated from a first position to a second position, the expandable volume 130 increases the volume of the of space between the sheet 140 and the base 102 such that the distance as measured from the second side 106 of the base 102, over the expandable volume 130, to the first side 104 of the base 102 increases. Thus, the expandable volume 130 acts as a cam to create a longer distance for the sheet 140 to travel around the base 102. The expandable volume 130 shown in FIGS. 1A and 1B is disposed on the outwardly facing surface of the base 102 of the device 100 between the first side 104 of the base 102 and the second side 106 of the base 102. The expandable volume 130 can be coupled to the base 102 of the device 100 in any way capable of holding the expandable volume 130 stationary relative to the base 102, such as one or more stitches, buttons, a zipper, adhesive, or fasteners. The expandable volume 130 shown in the illustrated implementations of FIGS. 1A and 1B as an inflatable cushion. The expandable volume 130 is actuatable between a first position (shown in FIG. 1A), wherein the inflatable cushion is in a deflated state, and a second position (shown in FIG. 1B), wherein the cushion is fully inflated. However, in other implementations, the first position and the second position are any other states of expansion possible with the expandable volume. The expandable volume 130 shown in FIGS. 1A and 1B is disposed on the outwardly facing surface of the base 102, but in other implementations, the expandable volume is disposed on the inwardly facing surface of the base.

The device 100 can also include an electric pumping device 136 for actuating the inflatable cushion from the first position to the second position. The pumping device 136 in FIGS. 1A and 1B is an electric air compressor disposed externally to the inflatable cushion. The pumping device 136 is located external to the expandable volume 130 to limit noise and vibrations from disturbing the person 199 disposed on the support apparatus 160. However, in other implementations, the pumping device is disposed on the base, is disposed on or within the support apparatus 160, or is disposed on or within the expandable volume. In some implementations, the pump is a manual pump.

Figure 7A:
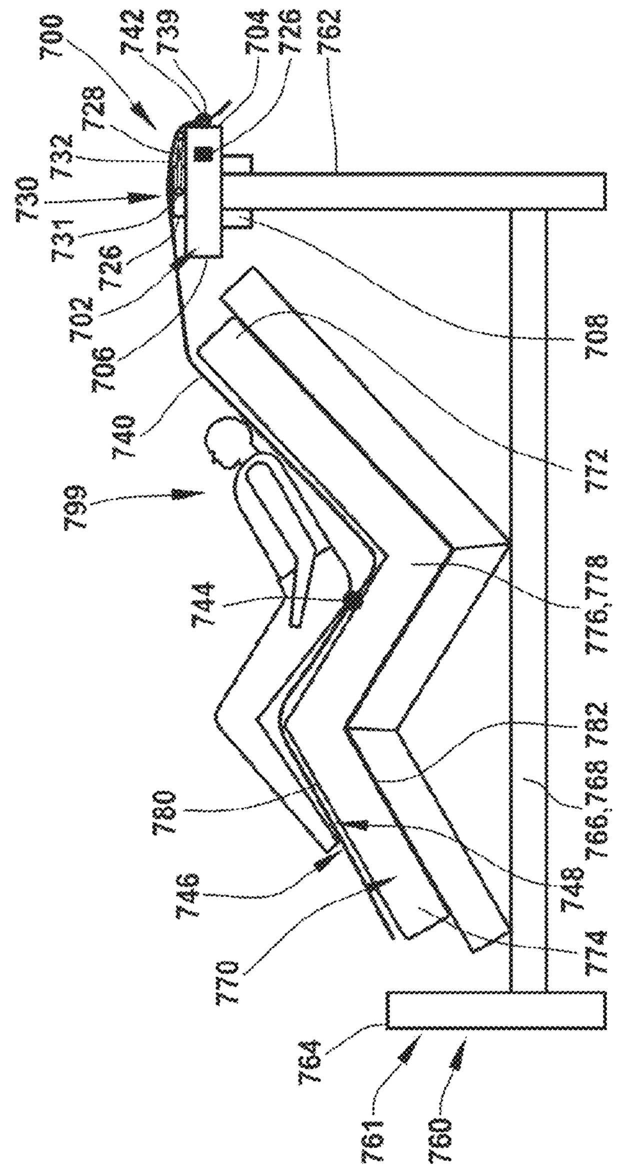
FIGS. 7A and 7B are side views of a device for moving a person on a bed, according to another implementation.
Figure 7B:
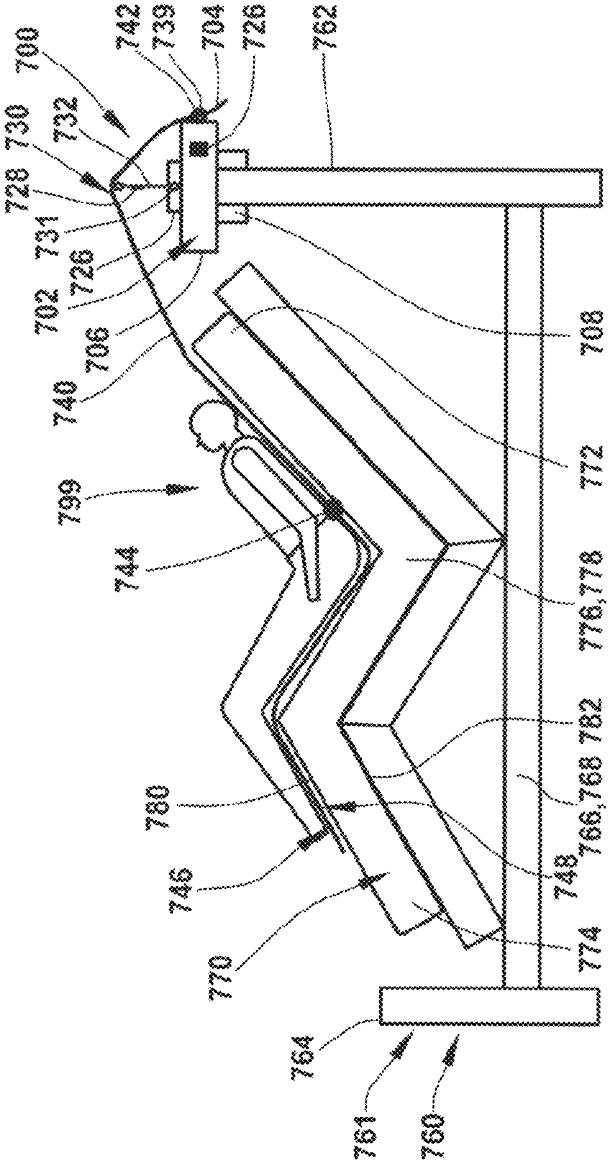

FIGS. 7A and 7B show an implementation of the device 700 including an expandable volume 730 that is a rotatable arm. The rotatable arm includes a shaft 731 and an arm 732. The device also includes a motor 726 coupled to the shaft 731 for rotating the rotatable arm from a first position wherein the arm 732 is perpendicular to the second side 706 (shown in FIG. 7A) to a second position wherein the arm 732 is parallel to the second side 706 (shown in FIG. 7B). When the expandable volume 730 is actuated from the first position to the second position, the distance as measured from the second side 706 of the base 702, over the expandable volume 730), to the first side 704 of the base 702 is increased. Thus, the second portion 744 of the sheet 740 is moved closer to the base 702 when the expandable volume 730) is actuated from the first position to the second position. Although FIGS. 7A and 7B show an electric motor 726 for actuating the expandable volume 730, in some implementations, the shaft of the rotatable arm includes a handle for actuating the expandable device from a first position to a second position.

Figure 8A:
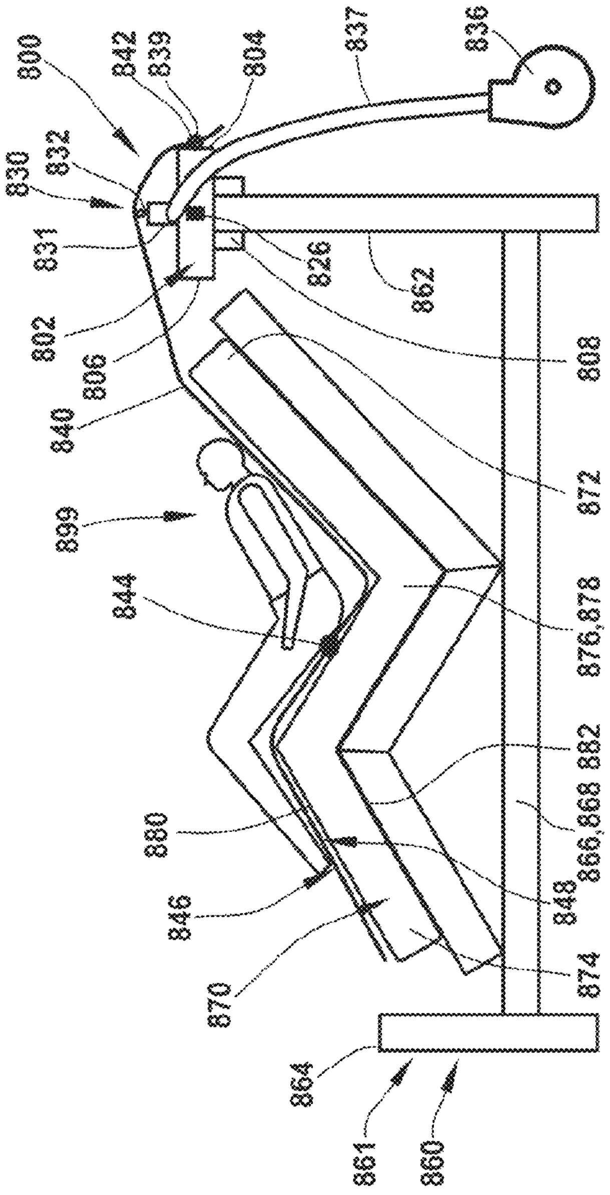
FIGS. 8A and 8B are side views of a device for moving a person on a bed, according to another implementation.
Figure 8B:
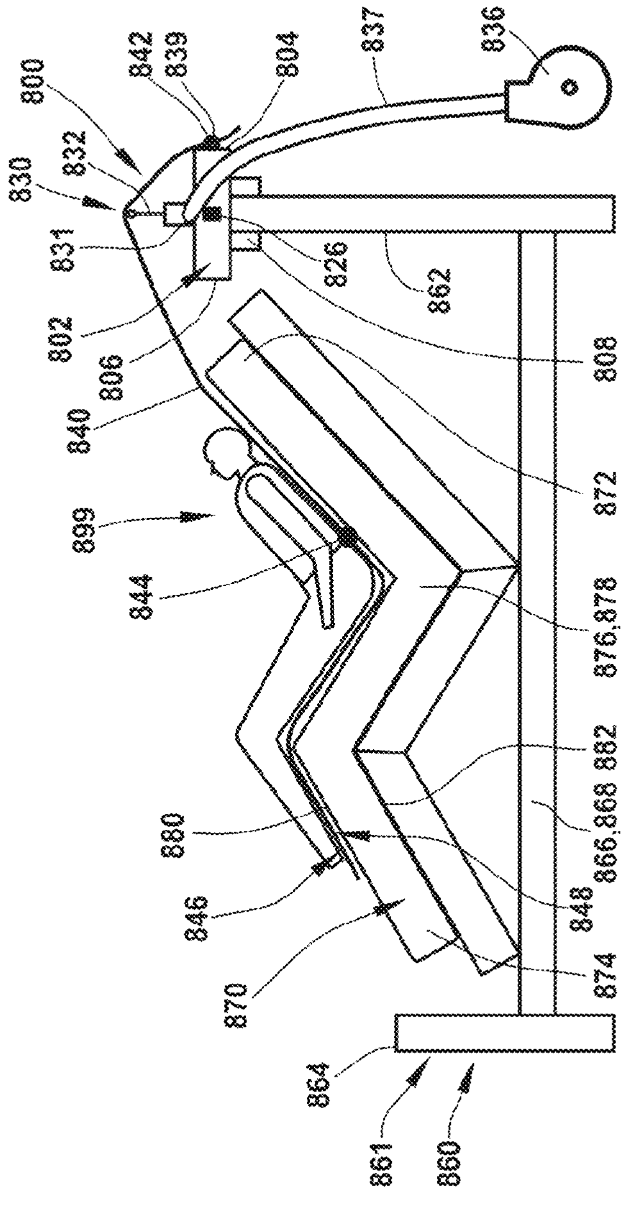

FIGS. 8A and 8B show an implementation of the device 800 including an expandable volume 830 that is a telescoping arm. The telescoping arm includes a cylinder body 831 and a piston rod 832. The device also includes a pump 836 coupled to the cylinder body 831 for introducing air into the cylinder body 831 to cause the piston rod 832 to actuate from a first position wherein the piston rod 832 is retracted toward the base 802 (shown in FIG. 8A) to a second position wherein the piston rod 832 is extended away from the base 802 (shown in FIG. 8B). When the expandable volume 830 is actuated from the first position to the second position, the distance as measured from the second side 806 of the base 802, over the expandable volume 830, to the first side 804 of the base 802 is increased. Thus, the second portion 844 of the sheet 840 is moved closer to the base 802 when the expandable volume 830 is actuated from the first position to the second position. In some implementations, the pump is a manual pump.

The device 100 shown in FIGS. 1A and 1B also includes a sheet 140. The sheet 140 has a first portion 142 and a second portion 144 opposite and spaced apart from the first portion 142. The first portion 142 of the sheet 140 is removably coupled to the base 102 such that the sheet 140 can be removed from the device 100 for cleaning or disposal. The first portion 142 of the sheet 140 remains stationary with respect to the base 102 of the device 100 even with movement of the person 199. The sheet 140 extends from the first portion 142 where it is coupled, over the second side 106 of the base 102, over the expandable volume 130, and over the first side 104 of the base 102. The sheet 140 continues to extend over the top surface 180 of the mattress 170 such that the second portion 144 of the sheet 140 is under and supporting the person 199. The sheet 140 is decouplable from the base 102 so that it can be disposable. For example, the first portion 142 of the sheet 140 is coupled to the base 102 by clamps. However, in other implementations, the first portion of the sheet is coupled to the base by one or multiple fasteners, including hook and loop, a zipper, an adhesive, or any other coupler capable of keeping the sheet coupled to the device when overcoming the forces applied to the sheet when the sheet is moving a person on the support apparatus, as discuss in more detail below. In some implementations, the first portion of the sheet is coupled to a portion of the support apparatus such that the first portion of the sheet remains stationary with respect to the device. In some implementations, the sheet is permanently coupled to the device or support apparatus.

Figure 5A:
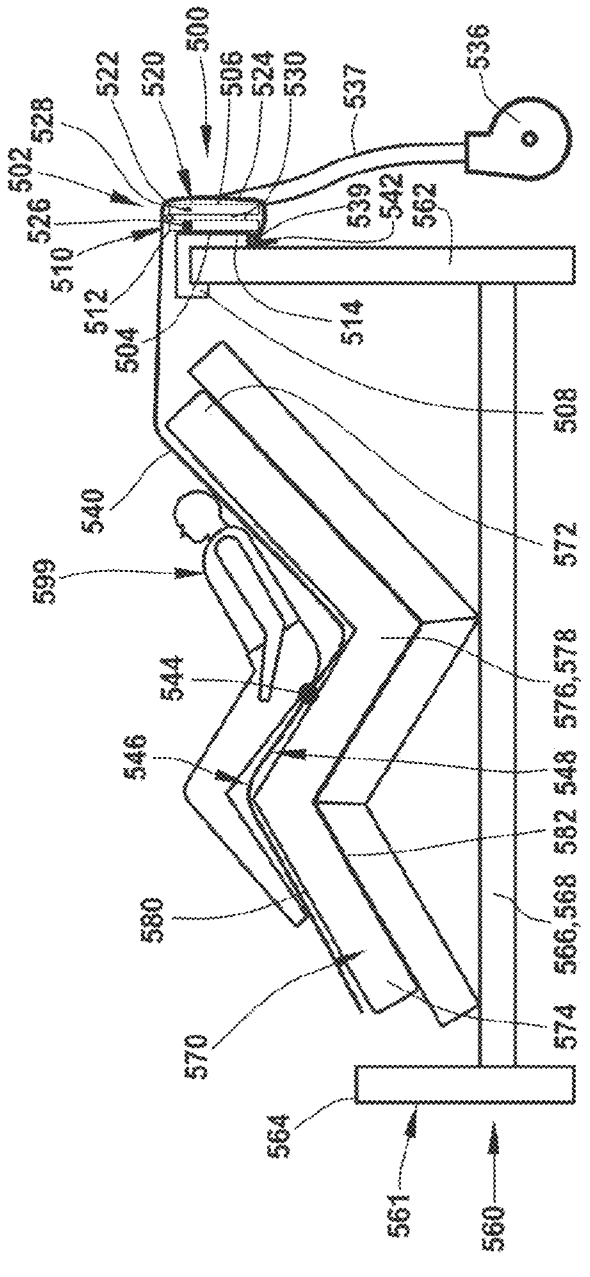
FIGS. 5A and 5B are side views of a device for moving a person on a bed, according to another implementation.
Figure 5B:
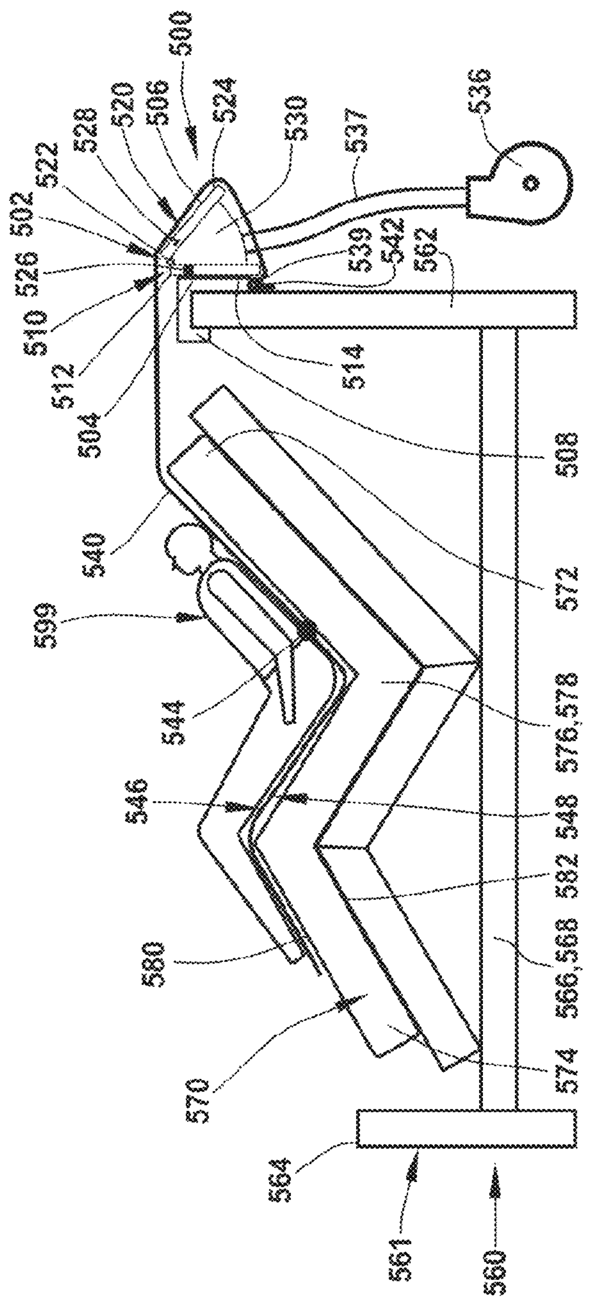

The device 100 also includes a sensor 126 coupled to the base 102 for determining the position of the expandable volume 130. The sensor 126 shown in FIGS. 1A and 1B is an ultrasonic distance sensor, and a tab 128 extends from the expandable volume 130 such that the sensor 126 can measure the distance between the sensor 126 and the tab 128. In other implementations, the sensor can be any other distance sensor, such as, an infrared sensor, an inductive sensor, a capacitive sensor, a photoelectric sensor, or any other sensor capable of measuring the distance of displacement of a portion of the expandable volume when the expandable volume is actuated from the first position to the second position, or vice versa. In other implementations, the sensor is an angular sensor, such as a rotary encoder, and the sensor is coupled to a rotating shaft (such as shaft 731 shown in FIGS. 7A and 7B) or a hinge (as shown in FIGS. 5A and 5B). In other implementations, the sensor is a pressure sensor disposed at least partially within an inflatable cushion or linear actuator type expandable volume.

In use, the expandable volume 130 begins in the first position. When the person 199 needs to be moved on the support apparatus 160 in the direction of the device 100, the pumping device 136 is powered to introduce pressurized air through a conduit 137 into the expandable volume 130. As the expandable volume 130 inflates, the expandable volume 130) moves to the second position. As the expandable volume 130 is actuated from the first position to the second position, the length of the sheet 140 extending from the second side 106 of the base 102 to the first side 104 of the base 102 is increased such that the second portion 144 of the sheet 140 is moved closer to the base 102 of the device 100 in the second position than in the first position. In other words, a length as measured from the second side 106 of the base 102, over the expandable volume 130, to the first side 104 of the base 102 is increased as the device is actuated from the first position to the second position. Because the second portion 144 of the sheet 140 is moved closer to the base 102 of the device 100 when the expandable volume 130) is actuated from the first position to the second position, the person 199 supported by the second portion 144 of the sheet 140 is also moved toward the device 100 such that the person 199 is boosted toward the head end 162 of the bed frame 161 and the head end 172 of the mattress 170).

Once the person 199 is moved to the desired position in the support apparatus 160, the expandable volume 130 is actuated from the second position back to the first position. For the device 100 shown in FIGS. 1A and 1B, the actuation of the expandable volume 130 from the second position to the first position includes releasing the pressure in the inflatable cushion such that the pressurized air within the inflatable cushion can flow out of the inflatable cushion. However, in other implementations, the pumping device is reversable, and the pumping device 136 can be actuated in reverse to suction the air from the inflatable cushion. If the patient's hips are approximately aligned with the hinge of the mattress and with sufficient friction between the person 199, the sheet 140, and the mattress 170, the person 199 will not immediately slide back away from the device 100 when the expandable volume 130 is actuated from the second position back to the first position. Although the sheet 140 of the device 100 shown in FIGS. 1A and 1B extends from the second side 106 of the base 102, over the expandable volume 130, to the first side 104 of the base 102, in some implementations, the sheet only extends from the second side of the base and over the expandable volume but does not extend to the first side of the base before extending toward and under the person. In these implementations, actuation of the expandable volume from the first position to the second position increases the length of the sheet as measured from the second side of the base to a point on the expandable volume where the sheet no longer contacts the expandable volume.

The device 100 includes a strain gauge 139 between the first portion 142 of the sheet 140 and the portion of the base 102 to which the first portion 142 of the sheet 140 is coupled. In some implementations, the strain gauge 139 is integrated into a portion of the sheet 140. When the person 199 is moved to the desired position in the support apparatus 160 and the expandable volume 130 is actuated from the second position back to the first position, it is desired that gravity causes the person 199 to slide back down the mattress 170 until the posterior of the person 199 is disposed on the mattress 170 such that the person 199 is prevented from further movement on the mattress 170. In this position, if the knee section of the bed 160 is properly elevated, the person's 199 hips are approximately in line with the hinge of the bed 160 on the mattress 170, which facilitates redistribution of pressure across the patient's body on the mattress 170. Because the patient is in the desired position, rather than out of the desired position such that the person 199 is supported by the friction of the sheet 140, the person 199 will not immediately further move or slide on the mattress 170 when the sheet 140 is moved toward the device 100. However, in some circumstances, gravity may not cause the person 199 to slide on the mattress to this desired position when the expandable volume 130 is actuated from the second position back to the first position, and the friction between the sheet 140) and the person 199 may prevent the person 199 from moving to the desired resting position. Over time, the force exerted on the back of the person 199 by the friction of the sheet 140 as the sheet 140 holds the person 199 can cause pressure sores. The pressure gauge 139 is configured to measure the strain being put on the sheet 140. The device 100 is configured to alert an assisting person when the strain measured by the strain gauge 139 is higher than a predetermined amount, indicating that the friction of the sheet 140 is holding an undesirable amount of the weight of the person 199. Thus, the strain a person 199 in the desired position puts on the sheet 140 is lower than the predetermined amount of strain.

In some implementations, the strain gauge 139 is configured to measure the strain on the sheet 140, and when the strain on the sheet 140 exceeds the predetermined amount of strain, the strain gauge 139 sends a signal to cause the expandable volume 130 to move from the first position to the second position to boost the person 199 in the support apparatus 160. When the expandable volume 130 moves from the second position to the first position such that the person 199 is in the desired position, as discussed above, the strain gauge 139 will measure a strain on the sheet 140 less than the predetermined amount. Over time, the person 199 may slide on the support apparatus 160, putting additional strain on the sheet 140. When the person 199 has moved far enough on the support apparatus 160 such that the strain on the sheet 140 exceeds the predetermined amount, the strain gauge 139 will send a signal, causing the expandable volume 130 to move from the first position to the second position to boost the person 199.

The sheet 140 shown in FIGS. 1A and 1B has a first side 146 for contacting the person 199 and a second side 148 opposite the first side 146 for contacting the mattress 170. The first side 146 of the sheet 140 is manufactured such that the relationship between the first side 146 of the sheet 140 and the skin of a person 199 has a first coefficient of friction, and the second side 148 of the sheet 140 is manufactured such that the relationship between the second side 148 of the sheet 140) and the mattress 170 has a second coefficient of friction. As discussed above, once the person 199 has been moved on the support apparatus 160, the expandable volume 130 is actuated from the second position back to the first position, which releases the tension in the sheet 140 between the device 100 and the person 199. The friction between the person 199 and the sheet 140, and the sheet 140 and the mattress 170, can prevent the person 199 from initially sliding back to the person's 199 prior position (i.e., away from the device 100). In some implementations, a second sheet (such as a fitted sheet) can be disposed between the sheet and the mattress to provide a consistent friction between the sheet and the bed.

As the person 199 moves in the support apparatus 160 over time, the person 199 may begin to slide on the support apparatus 160 away from the device 100. For repeated use of the device 100 for moving a person 199, low movement of the person 199 relative to the sheet 140 is desired such that subsequent actuation of the expandable volume 130 from the first position to the second position moves the person 199 back to the same position on the support apparatus 160 without the need for repositioning the sheet 140 under the person 199. Thus, for the sheet shown in FIGS. 1A and 1B, the first coefficient of friction between the first side 146 of the sheet 140 and the skin of the person 199 is higher than the second coefficient of the friction between the second side 148 of the sheet 140 and the mattress 170 such that the sheet 140 will slide along the mattress 170, rather than the person 199 sliding along the sheet 140. The sheet 140 shown in FIGS. 1A and 1B has a first coefficient of friction of 0.46 and a second coefficient of friction of 0.33. However, in other implementations, the first coefficient of friction can be any value greater than the second coefficient of friction. In some implementations, the second coefficient of friction is between 0.20 and 0.50. In some implementations, the second coefficient of friction is between 0.30 and 0.35.

Figure 2C:
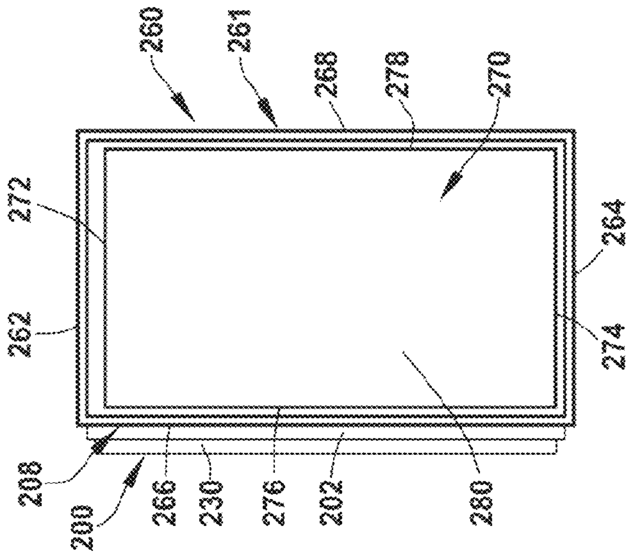
FIGS. 2A-2C are plan views of the device of FIGS. 1A and 1B coupled to different portions of the frame of a bed and the mattress of a bed.
Figure 2B:
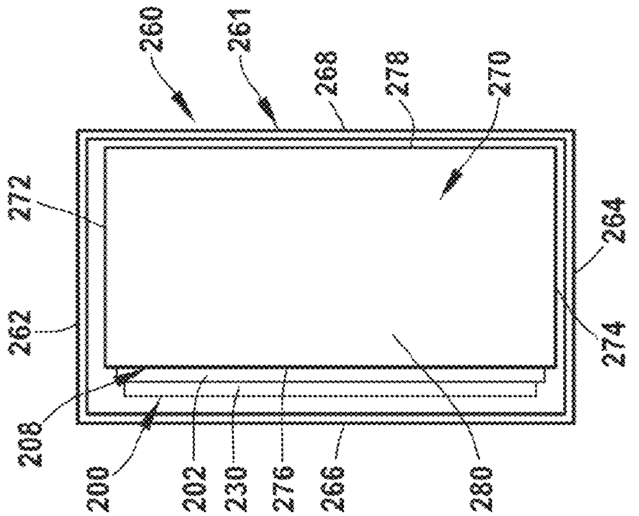
Figure 2A:
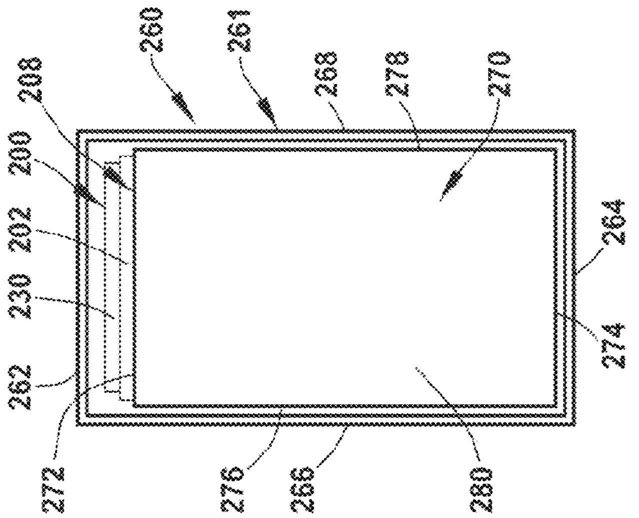

FIGS. 2A-2C show top views of various ways in which the support apparatus coupler 208 of the device 200 can be coupled to different portions of a bed 260. FIG. 2A shows the support apparatus coupler 208 coupled to the head end 272 of the mattress 270 of the bed 260. FIG. 2B shows the support apparatus coupler 208 coupled to the side end 276 of the mattress 270 of the bed 260. FIG. 2C shows the support apparatus coupler 208 coupled to the side end 266 of the frame of the bed 260.

Figure 3B:
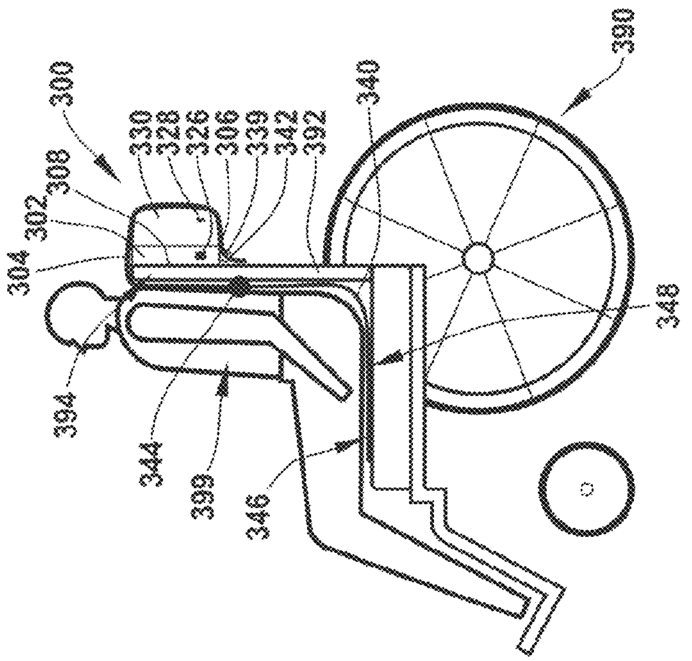
FIGS. 3A and 3B are side views of a device for moving a person in a wheel chair toward the top of the back support of the wheel chair, according to another implementation.
Figure 3A:
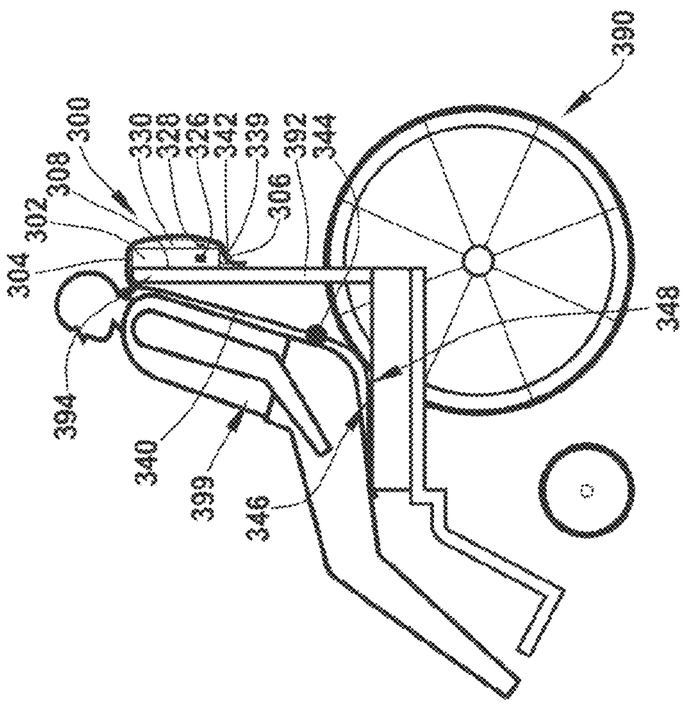

FIGS. 3A and 3B show a device 300 similar to the device 100 shown in FIG. 1, but the support apparatus 390 to which the device 300 in FIGS. 3A and 3B is coupled is a wheel chair 390. The support apparatus coupler 308 shown in FIGS. 3A and 3B is coupled to the back support 392 of the wheel chair 390 such that the sheet 340 extends over a top end 394 of the back support 392 and the second portion 344 of the sheet 340 supports the posterior of the person 399. In use, actuation of the expandable volume 330 from the first position (shown in FIG. 3A) to the second position (shown in FIG. 3B) causes the second portion 344 of the sheet 340 to move toward the device 300, causing the posterior of the person 399 to move toward the back support 392 and the back of the person 399 toward the top end 394 of the back support 392 of the wheel chair 390.

Figure 4:
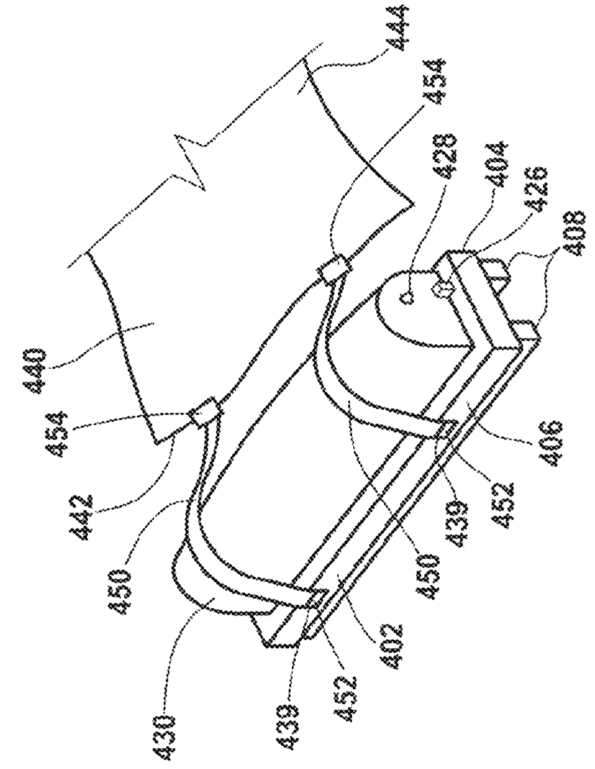
FIG. 4 is a perspective view of a device for moving a person on a bed toward the head end of the bed, according to another implementation.

FIG. 4 shows a device 400 similar to the device 100 shown in FIG. 1, but a sheet 440 is not directly coupled to the base 402 of the device 400 shown in FIG. 4. Instead, the base 402 of the device 400 includes a sheet coupler 450 for coupling the sheet 440 to the device 400. The sheet coupler 450 includes a web assembly having a first web assembly portion 452 coupled to the base 402 and a second web assembly portion 454 for affixing a sheet 440 to the base 402. The web assembly in FIG. 4 includes two straps that extend over the second side 406 of the base 402, over the expandable volume 430, and over the first side 404 of the base 402. The second web assembly portion 454 is coupled to a first portion 442 of a sheet 440, and the second portion 444 of the sheet 440 is supporting a person 499 (not shown). The web assembly functions as an extension of the sheet 440, allowing the device 400 to use a standard size sheet 440 and operate in the same way as described above with respect to the device 100 shown in FIG. 1. In some implementations, the second web assembly portion is coupled to a garment worn by the person, and actuation of the expandable volume moves the garment and person toward the device.

FIGS. 5A and 5B show another implementation of a device 500. The device 500) shown in FIGS. 5A and 5B is similar to the devices 200, 300, 400 shown in FIGS. 1-4, but the base 502 of the device 500 shown in FIGS. 5A and 5B includes a first base portion 510 rotatably coupled to a second base portion 520 with an expandable volume 530 disposed between the first base portion 510 and a second base portion 520. The first base portion 510 of the device 500 has a first end 512 and a second end 514 and includes the support apparatus coupler 508. The second base portion 520 also has a first end 522 and a second end 524. The first end 522 of the second base portion 520 is pivotably coupled to the first end 512 of the first base portion 510. The expandable volume 530 is disposed between the first base portion 510 and the second base portion 520 such that the second base portion 520 pivots relative to the first base portion 510 when the expandable volume 530 actuates from the first position to the second position. The first base portion 510 and the second base portion 520 of the device 500 shown in FIGS. 5A and 5B are pivotably coupled by a hinge, but in other implementations, the first base portion and the second base portion are pivotably coupled by any linkage capable of allowing the first and second base portions to pivot relative to each other while withstanding the forces exerted on the base during operation.

The first base portion 510 of the device 500 includes the first side 504, and the second base portion 520 includes the second side 506. The sheet 540 included in the device 500 in FIGS. 5A and 5B extends over the second side 506 of the second base portion 520, over the expandable volume 530, and over the first side 504 of the first base portion 510. Although the sheet 540) extends over the expandable volume 530 in this implementation, the sheet 540) in FIG. 5 does not contact the expandable volume 530 in either the first position or the second position. However, in some implementations, the sheet does contact the expandable volume in the first position, the second position, or both. The inclusion of the first base portion and the second base portion allow the expandable volume disposed between the first base portion and the second base portion to expand more evenly, and thus more predictably, than in the other implementations of the device shown in FIGS. 1-4. This configuration also allows the device 500 to be mounted in different locations on, and at different angles relative to, the support apparatus 560.

When the expandable volume 530 is actuated from the first position (shown in FIG. 5A) to the second position (shown in FIG. 5B), the expandable volume 530 causes the second base portion 520 to pivot relative to the first base portion 510 at the first end 522 of the second base portion 520, increasing the length of the portion of sheet 540) as measured from the second side 506, over the expandable volume 530, to the first side 504. Because of the increase in length of this portion of sheet 540, the second portion 544 of the sheet 540, and the person 599 supported by the second portion 544 of the sheet 540, are moved closer to the device 500.

Figure 6A:
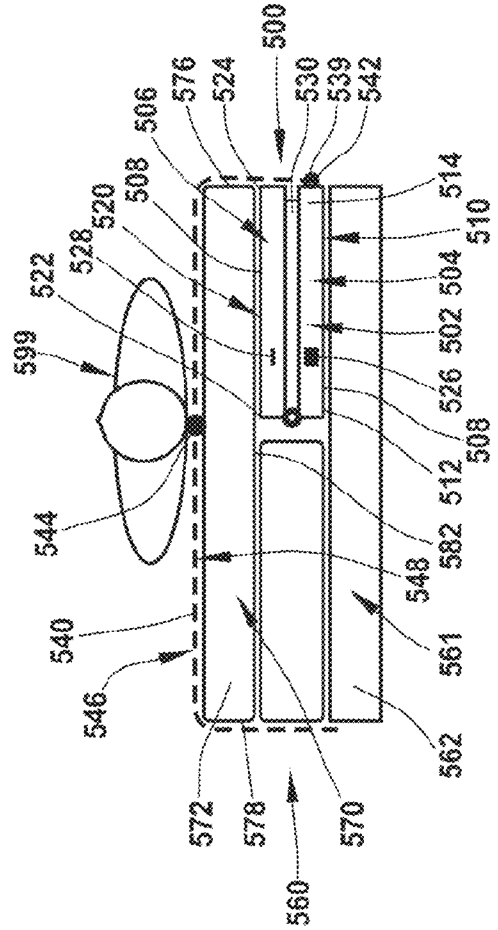
FIGS. 6A and 6B are end views of a device for moving and turning a person on a bed, according to the implementation of FIG. 5.
Figure 6B:
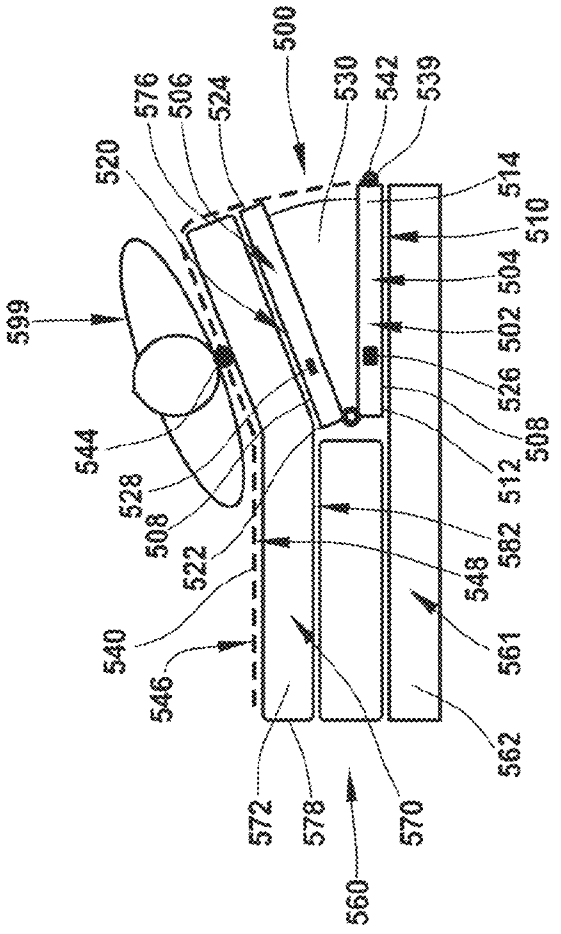

FIGS. 6A and 6B show the same device 500 shown in FIGS. 5A and 5B, but in FIGS. 6A and 6B, the device 500 is disposed at the side end 576 of a mattress 570 of a bed 560 to allow a person 599 to be easily turned on the person's side. As seen in FIG. 6A, some people 599 are too wide, and the bed 560 too narrow, to be fully turned directly on the person's 599 side in a comfortable manner. Thus, to have enough space to turn the person 599 on the person's 599 side, a person 599 must be moved toward one of the side ends 576, 578 of the mattress 570) before or concurrently with being turned in the direction of the opposite side end 576, 578 of the mattress 570.

The device 500 shown in FIGS. 6A and 6B is disposed adjacent the bottom surface 582 of the mattress 570) between the mattress 570) and the bed frame such that the second base portion 520 of the device 500 is in contact with the bottom surface 582 of the mattress 570. The support apparatus coupler 508 of the device 500 shown in FIGS. 6A and 6B is a friction coating disposed on the outer surfaces of the first base portion 510) and the second base portion 520. The friction between the bottom surface 582 of the mattress 570) and the device 500 and the friction between the bed frame 561 and the device 500 are sufficient to couple the device 500 to the bed 560. However, in other implementations, the support apparatus coupler includes a sleeve that securely fits over the side end of the bed frame, one or more straps that fit around the side end of the bed frame, one or more ratcheting straps that fit around the side end of the bed frame, one or more hook and loop strips, fasteners, a sewn stitch connecting to the side end of the bed frame, a friction coating, an adhesive, or any other coupler capable of keeping the device coupled to the support apparatus when overcoming the forces applied to the device when the device is moving a person on the support apparatus. In some implementations, the support apparatus coupler is coupled to or integral with the mattress of the bed. As described with respect to FIGS. 5A and 5B, when the expandable volume 530 of the device 500 is actuated from the first position (shown in FIG. 6A) to the second position (shown in FIG. 6B), the device 500 moves the second portion 544 of the sheet 540 toward the side end 576 of the mattress 570) where the device 500 is located. However, because the device 500 is disposed on the bottom surface 582 of the mattress 570), actuation of the expandable volume 530) from the first position to the second position raises the side end 576 portion of the mattress 570) disposed directly above the device 500. Thus, as the device 500 causes the side end 576 of the mattress 570 to rise with respect to the bed frame, creating an incline in the mattress 570, the second portion 544 of the sheet 540 moves up the incline in the mattress 570) toward the side end 576 of the mattress 570 where the device 500 is disposed. Because the second portion 544 of the sheet 540 is supporting the person 599, the person 599 is moved up the inclined side end 576 of the mattress 570. Once the person 599 is moved toward the side end 576 of the mattress 570, enough space exists to turn the person 599 toward the other side end 578 of the mattress 570. Because the person 599 has been moved onto the inclined portion of the mattress 570, the person 599 can easily be turned onto the person's 599 side.

Although FIGS. 6A and 6B show a device 500 having a first base portion 510 and a second base portion 520 hingedly coupled around the expandable volume 530, in other implementations, the expandable volume has only a single base like the expandable volume 130 of device 100 shown in FIGS. 1A and 1B. Such a device can be disposed adjacent the bottom surface of the mattress between the mattress and the bed frame such that the expandable volume of the device is in contact with the bottom surface of the mattress.

Figure 9B:
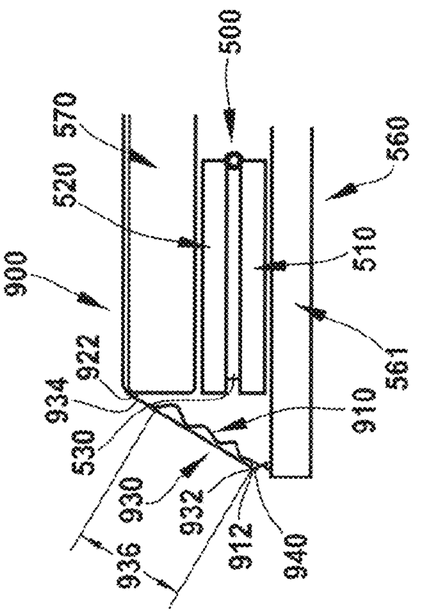
FIGS. 9B and 9C are detail views of the first elastic strip of the sheet of FIG. 9A.
Figure 9C:
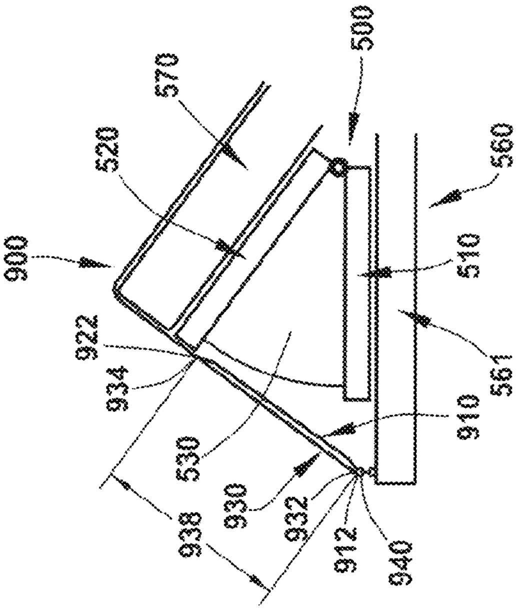
Figure 9A:
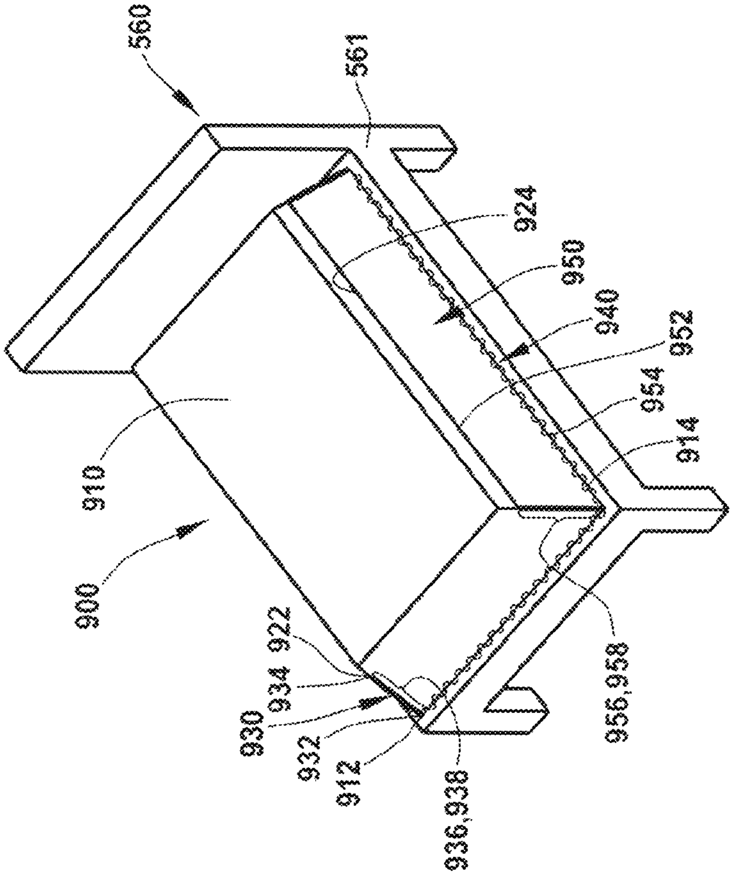
FIG. 9A is a perspective view of a sheet for being coupled to the device for moving a person on a bed shown in FIGS. 6A and 6B, according to one implementation.

FIGS. 9A-9C shows a sheet 900 for use with the device 500 for moving a person on a support apparatus shown in FIGS. 6A and 6B. The sheet 900 has a main body 910, a first elastic strip 930, and a second elastic strip 950. The elastic strips 930, 950 are disposed along the sides of the sheet 900 and allow for the sheet 900 to expand when the device 500 is actuated from the first position to the second position. When the device 500 is actuated from the second position back to the first position, the resilient elastic strips 930, 950 retract the main body 910 of the sheet 900 back to the relaxed position, shifting the sheet 900 back to its original position rather than allowing the sheet 900 to stay shifted to one side of the bed 560.

The main body 910 of the sheet 900 has a first sheet edge 912 and a second sheet edge 914 spaced apart and opposite from the first sheet edge 912. The first sheet edge 912 and the second sheet edge 914 are configured to be disposed adjacent the side ends 576, 578 of the bed 560.

The main body 910 of the sheet 900 includes a coupler 940, shown in FIG. 9A as a half of a zipper, extending along the edge 912, 914 of the main body 910. The coupler 940 of the main body 910 is configured such that the main body 910 of the sheet 900 can be coupled to another half of a zipper affixed to the frame 561 of the bed 560. Although the coupler 940 shown in FIG. 9A is a zipper, in other implementations, the coupler is by one or multiple fasteners, including hook and loop, an adhesive, a button/loop, straps, or any other coupling device capable of keeping the main body of the first sheet edge and second sheet edge stationary relative to the bed frame. In some implementations, only the first sheet edge and the second sheet edge include couplers. Although the coupler 940 in FIG. 9A-9C is shown coupled to a portion of the frame 561 of the bed 560, in other implementations, the coupler is coupled to at least a portion of the device, the mattress, the support apparatus, or any other object such that the edges of the main body are stationary with respect to the first and second elastic strips.

The first elastic strip 930 has a first edge 932 and a second edge 934 spaced apart and opposite the first edge 932, and the second elastic strip 950 has a first edge 952 and a second edge 954 spaced apart and opposite the first edge 952. The first and second elastic strips 930, 950 are made from spandex, but in other implementations, the first and second elastic strips are made of any elastic fabric. The first and second elastic strips 930, 950 are resiliently biased toward a relaxed position and urgable to an extended position. The first edge 932 of the first elastic strip 930 is coupled to the first sheet edge 912, and the second edge 934 of the first elastic strip 930 is coupled to a first portion 922 of the main body 910. Similarly, the second edge 954 of the second elastic strip 950 is coupled to the second sheet edge 914, and the first edge 952 of the second elastic strip 950 is coupled to a second portion 924 of the main body 910.

When the first elastic strip 930 is in the relaxed position (as shown in FIG. 9B), the first relaxed width 936, as measured between the first edge 932 and second edge 934 of the first elastic strip 930, is less than the distance between the first sheet edge 912 and the first portion 922 of the main body 910. When the first elastic strip 930 is in the extended position (as shown in FIG. 9C), the first extended width 938, as measured between the first edge 932 and second edge 934 of the first elastic strip 930, is equal to the distance between the first sheet edge 912 and the first portion 922 of the main body 910 such that the main body 910 of the sheet 900 prevents the first elastic strip 930 from being urged beyond the first extended position. Similarly, when the second elastic strip 950 is in the relaxed position, the second relaxed width 956, as measured between the first edge 952 and second edge 954 of the second elastic strip 950, is less than the distance between the second sheet edge 914 and the second portion 924 of the main body 910. When the second elastic strip 950 is in the extended position, the second extended width 958, as measured between the first edge 952 and second edge 954 of the second elastic strip 950, is equal to the distance between the second sheet edge 914 and the second portion 924 of the main body 910 such that the main body 910 of the sheet 900 prevents the second elastic strip 950 from being urged beyond the second extended position.

In FIGS. 9B and 9C, the distance between the first sheet edge 912 and the first portion 922 of the main body 910 is double the first relaxed width 936 of the first elastic strip 930, and the distance between the second sheet edge 914 and the second portion 924 of the main body 910 is double the second relaxed width 956 of the second elastic strip 950. However, in other implementations, the relative widths of the first relaxed width versus the distance between the first sheet edge and the first portion of the main body, and the relative widths of the second relaxed width versus the distance between the second sheet edge and the second portion of the main body, can be any desired ratio such that the sheet can extend when the device moves from the first position to the second position.

Figure 10:
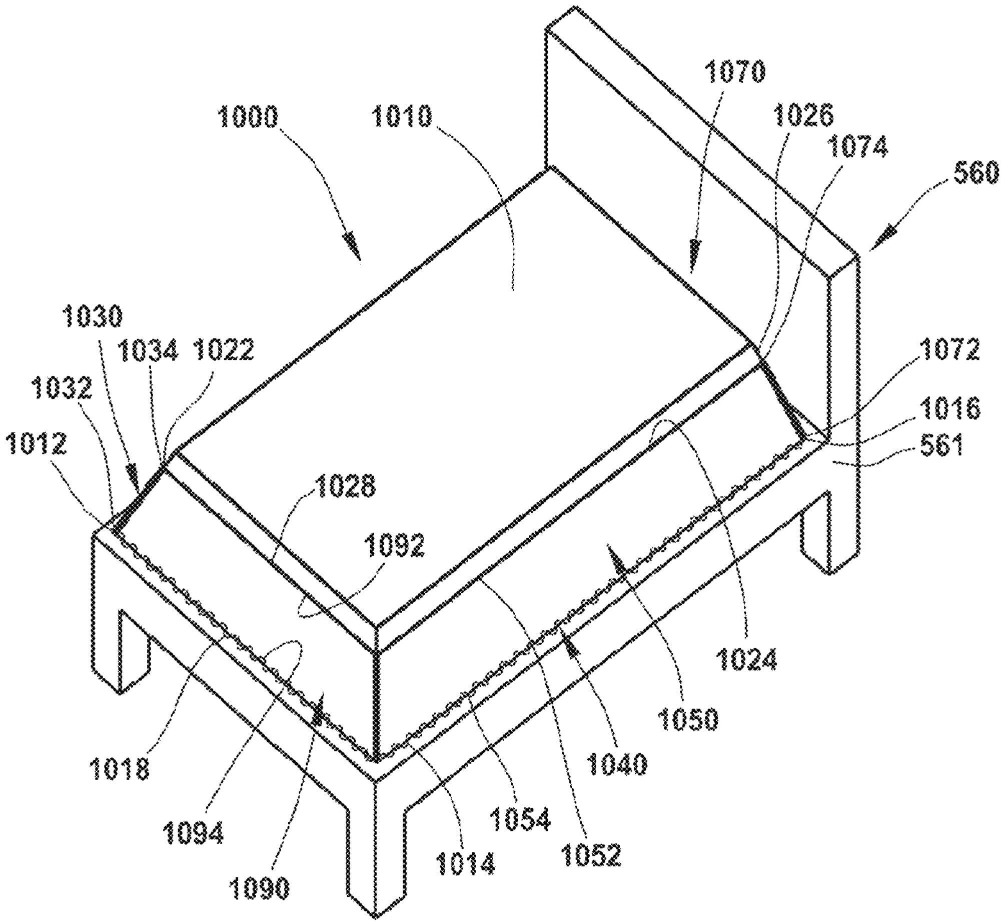
FIG. 10 is a perspective view of a sheet for being coupled to the device for moving a person on a bed shown in FIGS. 6A and 6B, according to another implementation.

FIG. 10 shows a sheet 1000 including a first elastic strip 1030 and second elastic strip 1050 similar to the first elastic strip 930 and second elastic strip 950 of sheet 900 shown in FIGS. 9A-9C. However, the sheet 1000 shown in FIG. 10 further includes a third elastic strip 1070 and a fourth elastic strip 1090. Because the sheet 1000 includes features similar to the sheet 900 shown in FIGS. 9A-9C, features of sheet 1000 are indicated using similar reference numbers.

The third elastic strip 1070 has a first edge 1072 and a second edge 1074 spaced apart and opposite the first edge 1072, and the fourth elastic strip 1090 has a first edge 1092 and a second edge 1094 spaced apart and opposite the first edge 1092. The third and fourth elastic strips 1070, 1090 are made from spandex, but in other implementations, the third and fourth elastic strips are made of any elastic fabric. The third and fourth elastic strips 1070, 1090 are resiliently biased toward a relaxed position and urgable to an extended position. The first edge 1072 of the third elastic strip 1070 is coupled to the third sheet edge 1016, and the second edge 1074 of the third elastic strip 1070 is coupled to a third portion 1026 of the main body 1010. Similarly, the second edge 1094 of the fourth elastic strip 1090 is coupled to the fourth sheet edge 1018, and the first edge 1092 of the fourth elastic strip 1090 is coupled to a fourth portion 1028 of the main body 1010.

When the first or second elastic strip 1030, 1050 is urged to the extended position, the third and fourth elastic strips 1070, 1090 are able to extend to allow the main body 1010 of the sheet 1000 to shift toward a side of the bed 560 without the third sheet edge 1016 or the fourth sheet edge 1018 wrinkling.

For both the sheet 900 shown in FIGS. 9A-9C and for the sheet 1000 shown in FIG. 10, a fitted sheet can be disposed over the sheet 900, 1000 to act as a protective layer between the person and the sheet 900, 1000. The fitted sheet can include a drawstring around the perimeter to secure the fitted sheet onto the mattress 570) and/or bed 560 when the devices disclosed herein are actuated to move the mattress 570 and/or the sheet 900, 1000. However, a standard fitted sheet having elastic around the perimeter could be used as well.

Figure 11A:
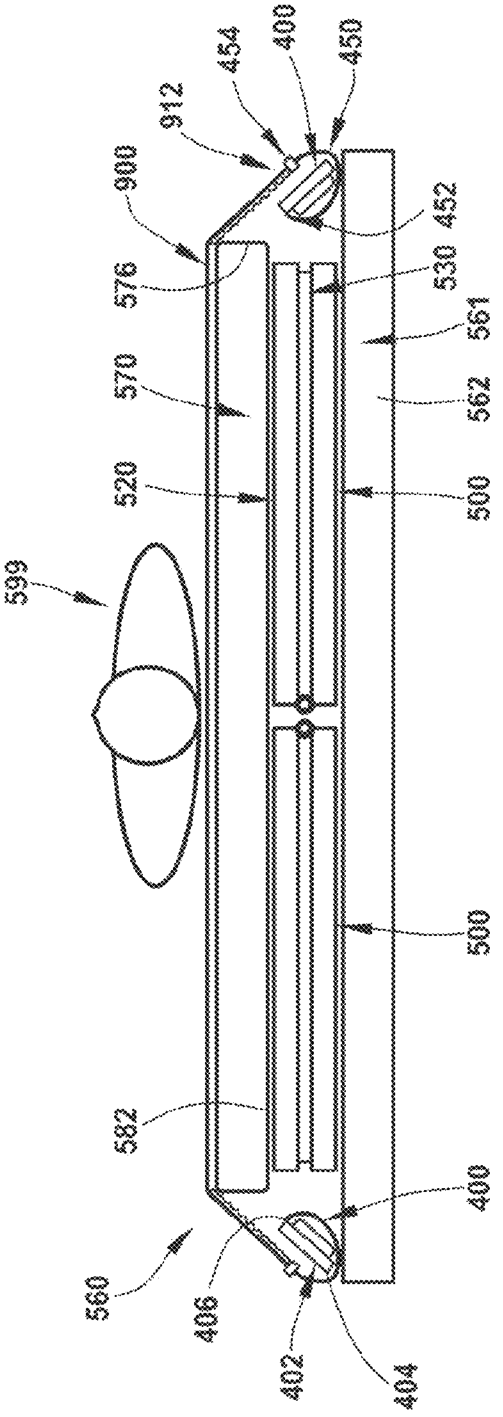
FIGS. 11A and 11B are end views of a device for moving and turning a person on a bed, according to the implementation of FIGS. 6A and 6B, and including the device for moving a person on a bed shown in FIG. 4 and the sheet shown in FIGS. 9A-9C.
Figure 11B:
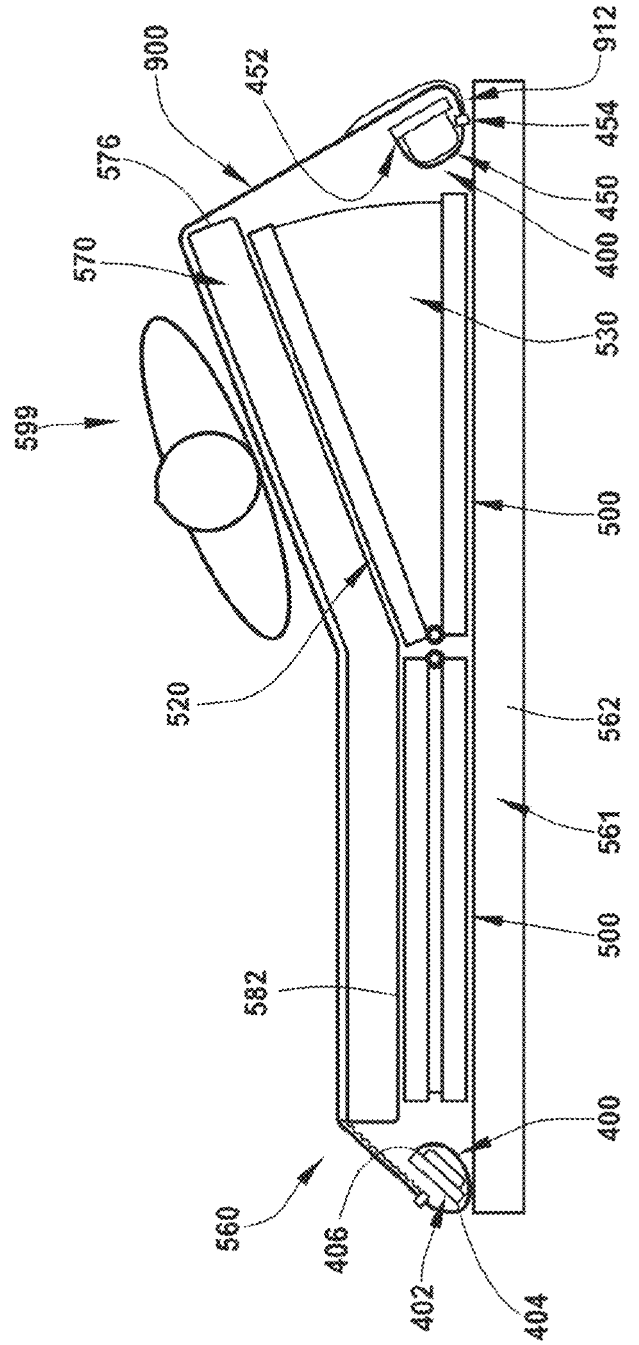

FIGS. 11A and 11B show two of the devices 500 as shown in FIGS. 6A and 6B being used with the sheet 900 shown in FIGS. 9A and 9C and two of the devices 400 shown in FIG. 4. One of the devices 500 is disposed adjacent the bottom surface 582 of the side end 576 of the mattress 570) between the mattress 570) and the bed frame 561 such that the second base portion 520 of the device 500 is in contact with the bottom surface 582 of the mattress 570). The other of the devices 500 is disposed adjacent the bottom surface 582 of the side end 578 of the mattress 570) between the mattress 570 and the bed frame 561 such that the second base portion 520 of the device 500 is in contact with the bottom surface 582 of the mattress 570). However, the first and second sheet edges 912, 914 of sheet 900 are not coupled to the devices 500 as shown in FIGS. 6A and 6B or to the bed frame 561 as shown in FIGS. 9A-9C. In FIGS. 11A and 11B, the first and second sheet edges 912, 914 of sheet 900 are coupled to the two devices 400 via sheet couplers 450.

As shown in detail in FIG. 4, the sheet couplers 450 each include a web assembly having a first web assembly portion 452 coupled to the base 402 and a second web assembly portion 454 for affixing the sheet 900 to the base 402. The web assembly in FIGS. 11A and 11B includes multiple straps that extend over the second side 406 of the base 402, over the expandable volume 430, and over the first side 404 of the base 402. The second web assembly portion 454 is coupled to first sheet edge 912 of sheet 900.

Because the sheet 900 includes the first and second elastic strips 930, 950, the sheet 900 is urged to the expanded position, as shown in FIGS. 9B and 9C, when one of the devices 500 is actuated from the first position to the second position, as shown in FIGS. 11A and 11B. Normally, rather than pulling the sheet 900 as the device is actuated, the sheet 900 is allowed to stretch and the main body 910 remains stationary relative to the mattress 570. However, the device 400 coupled adjacent the side end 576 of the mattress 570 is coupled to the first sheet edge 912 of the sheet 900 such that, when actuated from the first position to the second position contemporaneously with the actuation of device 500, device 400 pulls the first sheet edge 912 to remove any slack created by the first elastic strip 930 of the sheet 900.

However, the second elastic strip 950 is still able to expand to create slack at the opposite edge of the sheet 900 such that the main body 910 of the sheet 900 can slide the person 599 in the bed 560.

Although FIGS. 11A and 11B include devices 500 for lifting portions of the mattress 570), other implementations include any other devices for moving a person on a support apparatus disclosed herein to lift portions of the mattress. Although FIGS. 11A and 11B include devices 400 for pulling the sheet 900, other implementations include any other devices for moving a person on a support apparatus disclosed herein to pull the sheet. In some implementations, rather than using the device 400 to pull the sheet 900, a roller rotatably coupled to a motor can be included for winding the sheet around the roller to pulling the sheet. Although FIGS. 11A and 11B include the sheet 900, other implementations can include the sheet 1000 disclosed in FIG. 10.

Figure 12A:
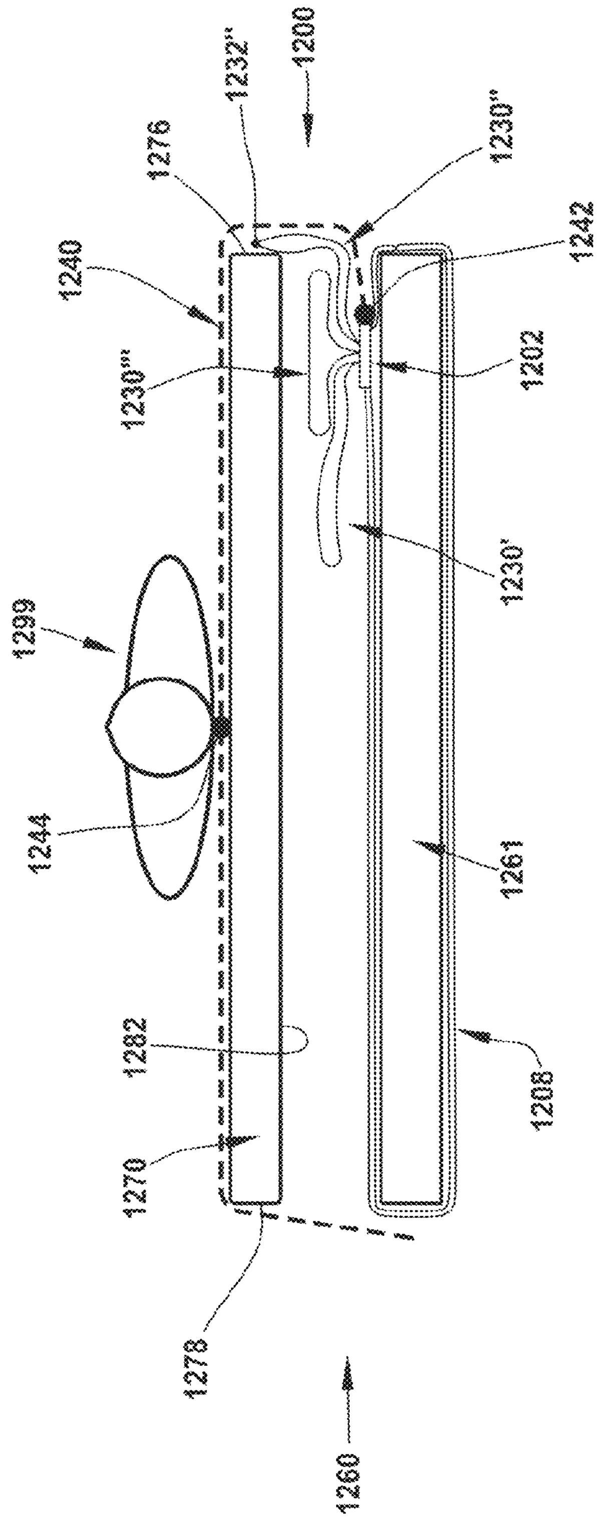
FIGS. 12A and 12B are end views of a device for moving and turning a person on a bed, according to another implementation.
Figure 12B:
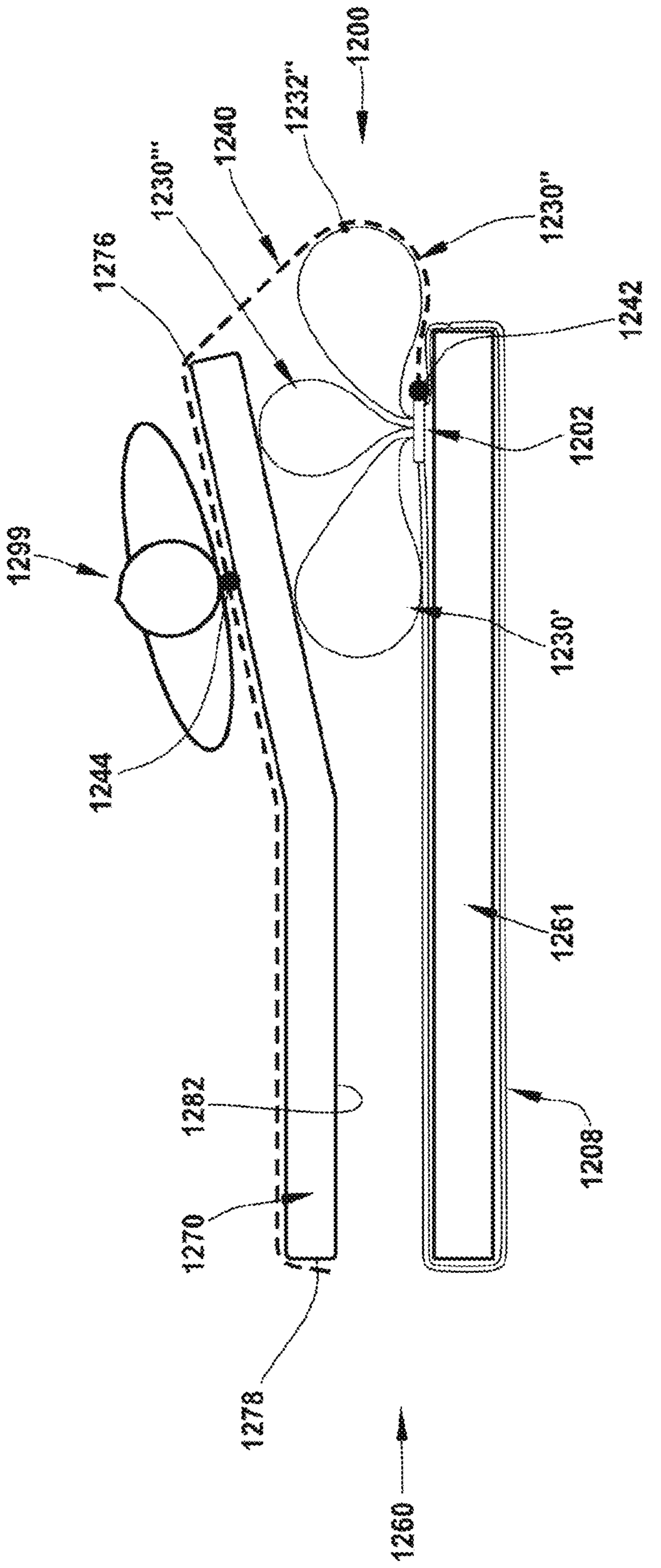

FIGS. 12A and 12B show an implementation of a device 1200 for disposing at the side end 1276 of a mattress 1270 of a bed 1260 to allow a person 1299 to be easily turned on the person's side. As seen in FIG. 12A, some people 1299 are too wide, and the bed 1260 too narrow, to be fully turned directly on the person's 1299 side in a comfortable manner. Thus, to have enough space to turn the person 1299 on the person's 1299 side, a person 1299 must be moved toward one of the side ends 1276, 1278 of the mattress 1270 before or concurrently with being turned in the direction of the opposite side end 1276, 1278 of the mattress 1270.

The device 1200 includes a base 1202 and three expandable volumes 1230. The base 1202 shown in FIGS. 12A and 12B is a strap manufactured from a flexible woven material, but in other implementations, the base is manufactured from any other flexible material, such as a thin material, or a rigid material. A first portion 1242 of a sheet 1240 is coupled to the base 1202 and a second portion 1244 of the sheet 1240 is wrapped over the side end 1276 of the mattress 1270 and over a top of the mattress 1270.

The support apparatus coupler 1208 is coupled to the base 1202. The support apparatus coupler 1208 couples the device 1200 to a portion of the bed 1260 such that the device 1200 is anchored to the bed 1260 and does not move relative to bed 1260 when the device 1200 is used. The support apparatus coupler 1208 shown in FIGS. 12A and 12B includes a strap for coupling the device 1200 around the bed frame 1261, as discussed below. However, in other implementations, the support apparatus coupler includes a sleeve that securely fits over the head end of the bed frame, one or more clamps, one or more ratcheting straps that fit around the head end of the bed frame, one or more hook and loop strips, fasteners, a sewn stitch connecting to the head end of the bed frame, a friction coating, an adhesive, or any other coupler capable of keeping the device coupled to the support apparatus when overcoming the forces applied to the device when the device is moving a person on the support apparatus and lifting a portion of the mattress, as discuss in more detail below.

The device 1200 includes an inner expandable volume 1230', an outer expandable volume 1230", and a middle expandable volume 1230'".

The inner expandable volume 1230' is disposed between the bottom surface 1282 of the mattress 1270) between the mattress 1270 and the bed frame 1261 such that the inner expandable volume 1230' of the device 1200 is in contact with the bottom surface 1282 of the mattress 1270. When the inner expandable volume 1230' of the device 1200 is actuated from the first position (shown in FIG. 12A) to the second position (shown in FIG. 12B), the inner expandable volume 1230' of the device 1200 moves the second portion 1244 of the sheet 1240 toward the side end 1276 of the mattress 1270 where the device 1200 is located. However, because the device 1200 is disposed on the bottom surface 1282 of the mattress 1270, actuation of the inner expandable volume 1230' from the first position to the second position raises the side end 1276 portion of the mattress 1270 disposed directly above the device 1200. Thus, as the inner expandable volume 1230' of the device 1200 causes the side end 1276 of the mattress 1270 to rise with respect to the bed frame 1261, creating an incline in the mattress 1270, the second portion 1244 of the sheet 1240 moves up the incline in the mattress 1270 toward the side end 1276 of the mattress 1270 where the device 1200 is disposed. Because the second portion 1244 of the sheet 1240 is supporting the person 1299, the person 1299 is moved up the inclined side end 1276 of the mattress 1270).

The outer expandable volume 1230" acts as a cam to increase the distance as measured from the base 1202, over the outer expandable volume 1230", to a portion 1232" of the outer expandable volume 1230" when the outer expandable volume 1230" is actuated from a first position (shown in FIG. 12A) to a second position (shown in FIG. 12B). When the outer expandable volume 1230" is actuated from a first position to a second position, the outer expandable volume 1230" increases the volume of the of space between the sheet 1240) and the base 1202 such that the distance as measured from the base 1202, over the outer expandable volume 1230", to the portion 1232" of the outer expandable volume 1230" increases. Thus, the outer expandable volume 1230" acts as a cam to create a longer distance for the sheet 1240 to travel around the outer expandable volume 1230". The outer expandable volume 1230" can be coupled to the base 1202 of the device 1200 in any way capable of holding the outer expandable volume 1230" stationary relative to the base 1202, such as one or more stitches, buttons, a zipper, adhesive, or fasteners. The outer expandable volume 1230" shown in the illustrated implementations of FIGS. 12A and 12B as an inflatable cushion. The outer expandable volume 1230" is actuatable between a first position (shown in FIG. 12A), wherein the inflatable cushion is in a deflated state, and a second position (shown in FIG. 12B), wherein the cushion is fully inflated. However, in other implementations, the first position and the second position are any other states of expansion possible with the outer expandable volume. As the outer expandable volume 1230" actuates from the first position to the second position, the device 1200 moves the second portion 1244 of the sheet 1240 further toward the side end 1276 of the mattress 1270) where the device 1200 is located as the inner expandable volume 1230' lifts the side end 1276 of the mattress 1270.

The middle expandable volume 1230'" is coupled to the base 1202 between, and disposed between, the inner expandable volume 1230' and the outer expandable volume 1230". When the middle expandable volume 1230'" of the device 1200 is actuated from the first position (shown in FIG. 12A) to the second position (shown in FIG. 12B), the middle expandable volume 1230'" applies pressure to the inner expandable volume 1230' and the outer expandable volume 1230" to force them into the desired positions. Because the middle expandable volume 1230'" is disposed under the mattress 1270, the middle expandable volume 1230'" also helps further raise the side end 1276 portion of the mattress 1270 disposed directly above the device 1200.

Although the inner expandable volume 1230', outer expandable volume 1230", and middle expandable volume 1230'" shown in FIGS. 12A and 12B are show being actuated from the first position to the second position at the same time, in some implementations, the inner expandable volume, outer expandable volume, and middle expandable volume are inflated at different times to stage their individual functions as desired. Although the inner expandable volume 1230', outer expandable volume 1230", and middle expandable volume 1230'" shown in FIGS. 12A and 12B are each inflatable devices, in other implementations, the inner expandable volume, outer expandable volume, and middle expandable volume are any other type of expandable volume disclosed herein.

Once the person 1299 is moved toward the side end 1276 of the mattress 1270, enough space exists to turn the person 1299 toward the other side end 1278 of the mattress 1270. Because the person 1299 has been moved onto the inclined portion of the mattress 1270, the person 1299 can easily be turned onto the person's 1299 side. After the device 1200 has been actuated once, the device 1200 can be deactivated to return the sheet 1240) and mattress 1270 to their original positions. The device 1200 can be actuated a plurality of times to continue to further turn the person 1299.

Although FIGS. 12A and 12B show only one device 1200 disposed under the side end 1276 of the mattress 1270, in some implementations, a second device 1200 is included under the other side end 1278 of the mattress 1270 such that the person can easily turned in the other direction.

Various other implementations include a method of turning a person in a range of 90-180 degrees on a support apparatus. The method includes providing a support apparatus having a first side, a second side opposite the first side, and a top surface extending between the first side and the second side. The support apparatus includes a first sheet disposed along at least a portion of the top surface, and a second sheet disposed along at least a portion of the first sheet such that the first sheet is disposed between the top surface and the second sheet. The first sheet has a first side and a second side. A person is disposed on the second sheet. The method further includes shifting the first sheet, relative to the support apparatus, in a direction toward the first side of the support apparatus: elevating the first side of the first sheet: shifting the second sheet, relative to the support apparatus and the first sheet, in a direction toward the second side of the support apparatus: lowering the first side of the first sheet: shifting the first sheet and the second sheet, relative to the support apparatus, in the direction toward the second side of the support apparatus: elevating the second side of the first sheet: and rolling the person in a range of 90-180 degrees in the direction toward the first side of the support apparatus.

Figure 13A:
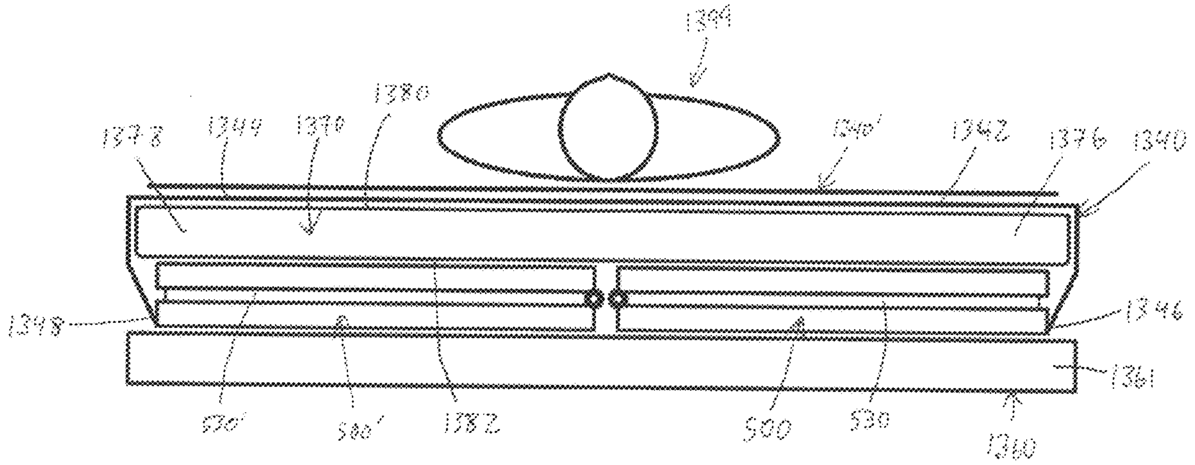
FIGS. 13A-13F are end views of the steps of a method of turning a person in a range of 90-180 degrees on a support apparatus, according to one implementation.

FIGS. 13A-13F show a method of turning a person 1399 in a range of 90-180 degrees on a support apparatus 1360, according to certain aspects. FIG. 13A shows a support apparatus 1360, for example, a mattress 1370) disposed on a hospital bed 1360. As with standard hospital beds 1360, the width of the mattress 1370) as measured from the first side 1376 to the second side 1378 is 36 inches. This limited width poses a problem for medical personnel when attempting to turn a person 1399 in a range of 90-180 degrees in a hospital bed 1360 because the average person laying in the center of the mattress 1370 does not have enough distance to either side of the person 1399 to roll 180 degrees before contacting the side rails of the hospital bed 1360. This problem is exacerbated when the person 1399 in the bed 1360 is obese because the person 1399 will have less distance to either side of the person 1399 and will move a longer distance when rolling in a range of 90-180 degrees.

In some implementations, the mattress is disposed on any type of bed or other structure. In some implementations, the mattress is disposed directly on the ground or a floor. In some implementations, the support apparatus is a wheelchair or any other device capable of supporting a person.

The mattress 1370 shown in FIGS. 13A-13F has a first side 1376, a second side 1378 opposite the first side 1376, a top surface 1380 extending between the first side 1376 and the second side 1378, and a bottom surface 1382 opposite the top surface 1380. Two of the devices 500, 500' described above and shown in FIGS. 6A and 6B are disposed between the bottom surface 1382 of the mattress 1370 and the bed frame 1361. However, it will be appreciated by those skilled in the art that any of the devices disclosed herein can be used in this method as described below. A first device 500 is disposed adjacent the first side 1376 of the mattress 1370, and a second device 500' is disposed adjacent the second side 1378 of the mattress 1370.

A first sheet 1340 is disposed along the top surface 1380 of the mattress 1370. The first sheet 1340 has a first side 1342 disposed adjacent the first side 1376 of the mattress 1370 and a second side 1344 disposed adjacent the second side 1378 of the mattress 1370. The first sheet 1340 further has a first edge 1346 along the first side 1342 of the first sheet 1340 and a second edge 1368 along the second side 1344 of the first sheet 1340. The first sheet 1340 is disposed on the top surface 1380 of the mattress 1370 such that the first edge 1346 of the first sheet 1340 is coupled to the first device 500 and the second edge 1368 of the first sheet 1340 is coupled to the second device 500'. The edges 1346, 1348 of the sheet 1340 can be coupled to the devices 500, 500' by any of the means described above. A second sheet 1340' is disposed along at least a portion of the first sheet 1340 such that the first sheet 1340 is disposed between the top surface 1380 of the mattress 1370 and the second sheet 1340'. A person 1399 is disposed on the second sheet 1340'.

Figure 13B:
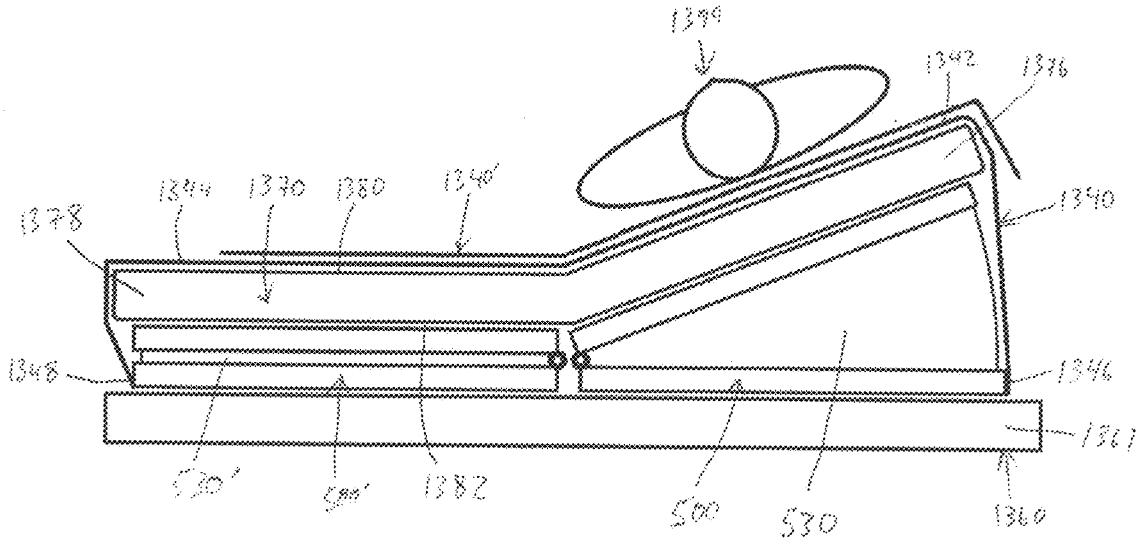

To turn the person 1399 in the range of 90-180 degrees in the bed 1360, the first device 500 is activated to inflate the expandable volume 530, as shown in FIG. 13B and described above with respect to FIGS. 6A and 6B. As the expandable volume 530 of the first device 500 inflates, the first device 500 elevates the first side 1376 of the mattress 1370 and the first side 1342 of the first sheet 1340. Because the first sheet 1340 is coupled to the first device 500 and extends around the expandable volume 530, the inflation of the expandable volume 530 of the first device 500 causes the first sheet 1340 to shift, relative to the mattress 1370, in a direction toward the first side 1376 of the mattress 1370, in the same way as described above.

The first device 500 and the dimensions of the hospital bed mattress 1370 can shift the first sheet 1340 by 9 inches in the direction toward the first side 1376 of the mattress 1370. However, in some implementations, the first sheet is shifted 4 or more inches in the direction toward the first side of the mattress.

Figure 13C:
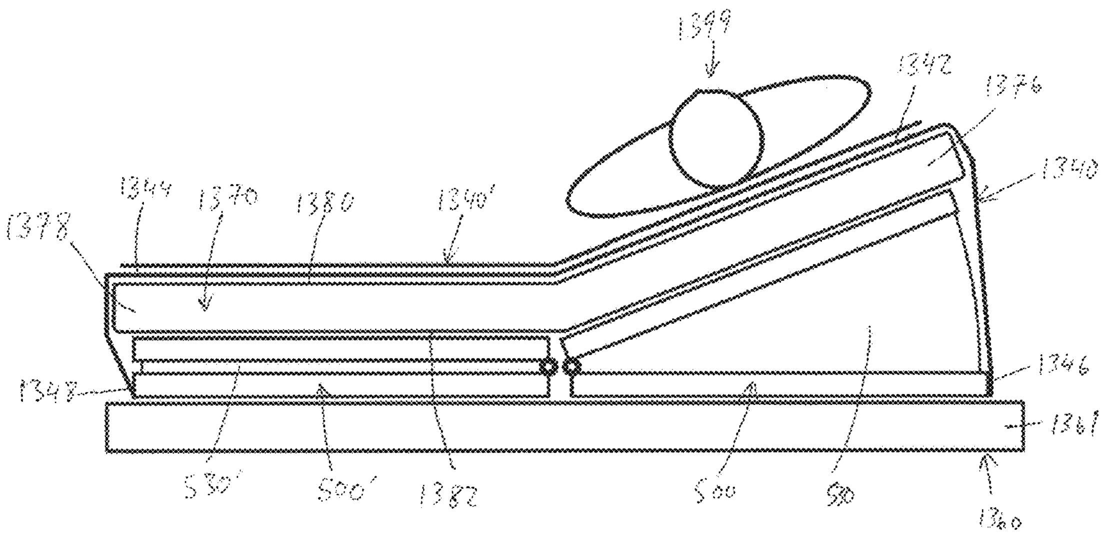

The shifting of the first sheet 1340 in the direction toward the first side 1376 of the mattress 1370 would typically cause the second sheet 1340' disposed on top of the first sheet 1340) to tend to also shift toward the first side 1376 of the mattress 1370. However, as the person 1399 disposed on the second sheet 1340' is shifted up the elevated and inclined first side 1342 of the first sheet 1340 on the first side 1376 of the mattress 1370, a caregiver can easily pull on an edge of the second sheet 1340' to cause the second sheet 1340' and the person 1399 to shift downhill due to gravity, as shown in FIG. 13C. Thus, the caregiver can easily cause the second sheet 1340' to shift, relative to the mattress 1370 and the first sheet 1340, in a direction toward the second side 1378 of the mattress 1370.

Because the first device 500 has already shifted the first sheet 1340 in a direction toward the first side 1376 of the mattress 1370 by 9 inches, the caregiver can shift the second sheet 1340' by 9 inches, relative to the first sheet 1340, to recenter the person 1399 on the mattress 1370. However, in implementations in which the first sheet is shifted 4 or more inches in the direction toward the first side of the mattress, the caregiver only needs to shift the second sheet 4 or more inches in the direction toward the second side of the mattress to recenter the person. In some implementations, the person is not recentered on the mattress after shifting the second sheet. In such implementations, the caregiver shifts the second sheet 4 or more inches in the direction toward the second side of the mattress to any position on the mattress.

It should be noted that each of the steps of shifting the first sheet 1340 in the direction toward the first side 1376 of the mattress 1370, elevating the first side 1342 of the first sheet 1340, and shifting the second sheet 1340' in a direction toward the second side 1378 of the mattress 1370 can be performed sequentially or simultaneously with one or both of the other above-mentioned steps.

Figure 13D:
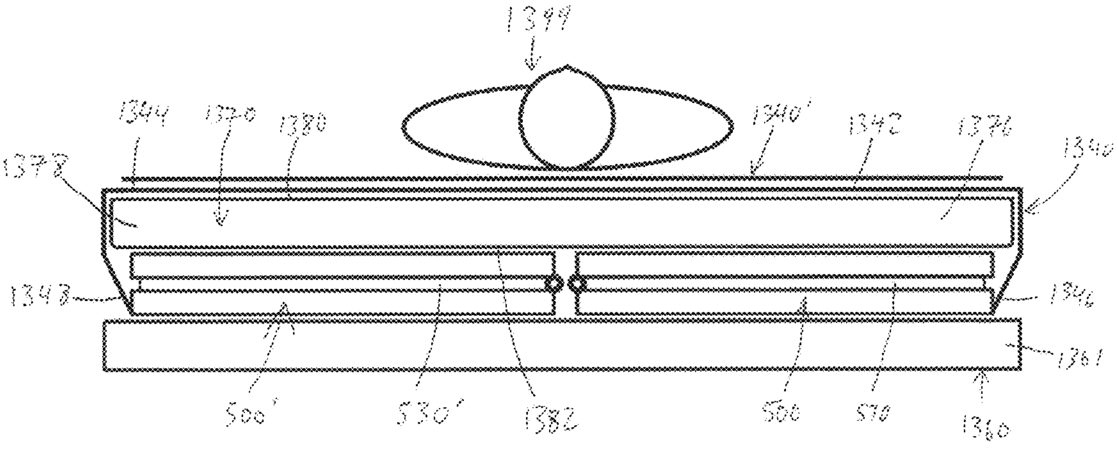

After the second sheet 1340' has been shifted, the first device 500 can be deactivated to deflate the expandable volume 530 of the first device 500 and allow the first side 1376 of the mattress 1370 and first side 1342 of the first sheet 1340 to lower to the mattress's 1370 and the first sheet's 1340 original elevation, as shown in FIG. 13D. At this point in the method, the second sheet 1340' and the person 1399 are located in their original position in the center of the mattress 1370. However, the first sheet 1340) has now shifted toward the first side 1376 of the mattress 1370 by 9 inches and remains in this position. Thus, the first sheet 1340 remains shifted 9 inches toward the first side 1376 of the mattress 1370) relative to the second sheet 1340'.

Figure 13E:
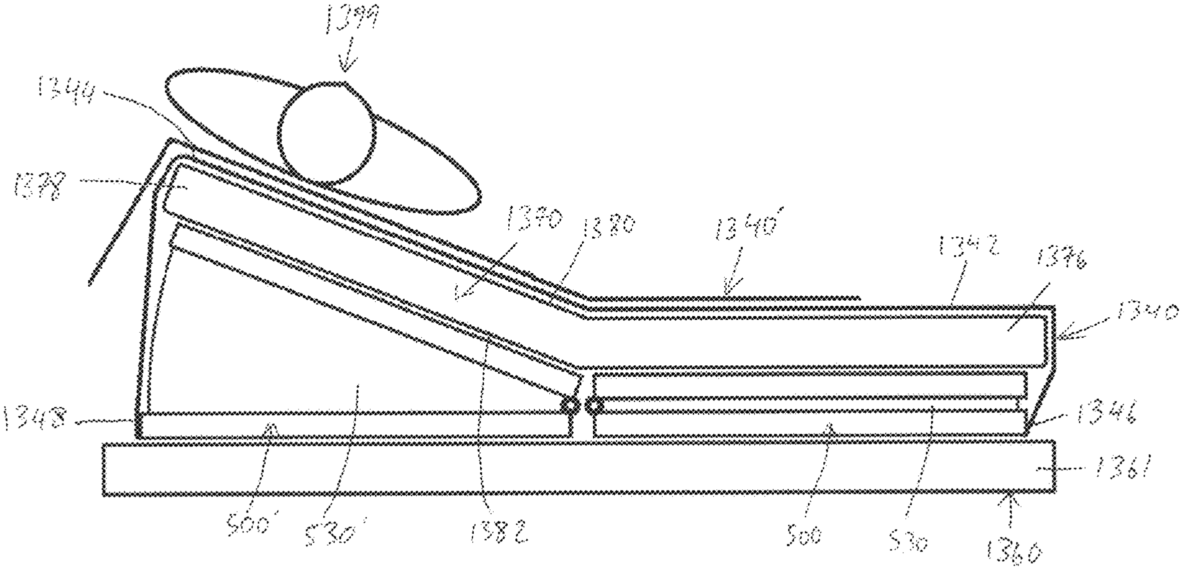

Once the first side 1376 of the mattress 1370 and the first sheet 1340) have been lowered, the second device 500' is activated to inflate the expandable volume 530', as shown in FIG. 13E and as described above with respect to FIGS. 6A and 6B. As the expandable volume 530)' of the second device 500' increases, the second device 500' elevates the second side 1378 of the mattress 1370 and the second side 1344 of the first sheet 1340. Because the first sheet 1340) is coupled to the second device 500' and extends around the expandable volume 530)' of the second device 500', the inflation of the expandable volume 530)' of the second device 500' causes the first sheet 1340) to shift, relative to the mattress 1370, in a direction toward the second side 1378 of the mattress 1370, in the same way as described above. However, because the first sheet 1340) is already shifted 9 inches toward the first side 1376 of the mattress 1370), the second device 500' causes the first sheet 1340 to shift 9 inches back to the center of the mattress 1370) and then an additional 9 inches toward the second side 1378 of the mattress 1370). Thus, the first sheet 1340 is able to shift a total of 18 inches in the direction toward the second side 1378 of the mattress 1370. Because the second sheet 1340)' and the person 1399 are disposed on top of the first sheet 1340, the second sheet 1340)' and the person 1399 also begin to move in the direction toward the second side 1378 of the mattress 1370.

Figure 13F:
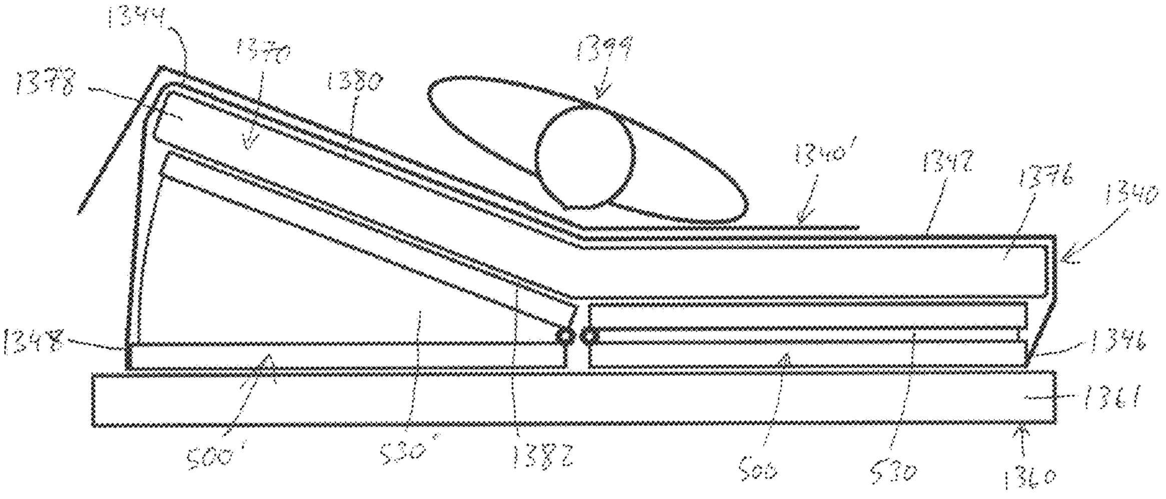

As the person 1399 disposed on the second sheet 1340' is shifted up the elevated and inclined second side 1344 of the first sheet 1340 on the second side 1378 of the mattress 1370), a caregiver can easily roll or turn the person 1399 in the direction toward the first side 1376 of the mattress 1370 downhill due to gravity as the second sheet 1340)' shifts in the direction toward the second side 1378 of the mattress 1370, as shown in FIG. 13F. This "treadmill" effect of the sheets 1340, 1340' moving in one direction while the person 1399 is turned in the opposite direction allows the person 1399 to effectively "roll-in-place" relative to the mattress 1370. Because the person 1399 is moving relative to the first sheet 1340) and not the mattress 1370, the usable distance that the person 1399 can be turned or rolled is determined by the distance from the position of the person 1399 to the first 1346 of the first sheet 1340, which is increased by 18 total inches by the final shift of the first sheet 1340 in the direction toward the second side 1378 of the mattress 1370. This additional usable distance for turning the person 1399 allows a caregiver to turn the person 1399 in a range from 90 degree to a full 180 degrees in the bed 1360. In some implementations, the person may be turned less than 90 degrees or more than 180 degrees.

The second device 500' and the dimensions of the hospital bed mattress 1370 shown in FIGS. 13A-13F can shift the first sheet 1340 by 9 additional inches in the direction toward the second side 1378 of the mattress 1370 (i.e., a total of 18 inches). However, in some implementations, the first sheet is shifted 4 or more additional inches in the direction toward the second side of the mattress. Because the first device has already shifted the first sheet in a direction toward the first side of the mattress by 9 inches, in implementations in which the first sheet is shifted 4 or more additional inches in the direction toward the second side of the mattress, the first sheet will only be shifted a total of 13 inches in the direction toward the second side of the mattress. Thus, the total distance to which the first sheet is shifted during this final shift in the direction of the second side is determined by the sum of the distances of both of the shifts of the first sheet. In some implementations, the methods described herein can be repeated to continue to turn the person further in the bed or to turn the person back to the person's initial position.

It should be noted that, although the steps of shifting the first sheet 1340 in the direction toward the second side 1378 of the mattress 1370, elevating the second side 1344 of the first sheet 1340, and rolling the person 1399 may be performed sequentially, the 18-inch total shift of the first sheet 1340 may cause the person 1399 to move all of the way to the second side 1378 of the mattress 1370 such that the person 1399 contacts the side rail of the bed 1360. In such situations, it may be necessary to begin the step of rolling the person 1399 in a range of 90-180 degrees in the direction toward the first side 1376 of the mattress 1370) simultaneously with the steps of shifting the first sheet 1340 in the direction toward the second side 1378 of the mattress 1370 and elevating the second side 1344 of the first sheet 1340.

Although the person 1399 shown in FIGS. 13A-13F begins in a supine position and is rolled 180 degrees to a prone position, it will be appreciated by those skilled in the art that the disclosed methods could be used to roll a person 180 degrees from a prone position to a supine position.

After the person 1399 has been rolled in a range of 90-180 degrees in the bed 1360, the second device 500' can be deactivated to deflate the expandable volume 530' of the second device 500' and allow the second side 1378 of the mattress 1370) and second side 1344 of the first sheet 1340 to lower to the mattress's 1370 and the first sheet's 1340 original elevation.

Various other implementations include a device for rotating a patient. The device includes a bottom sheet and a top sheet. The bottom sheet is configured to abut a surface of a bed in use. The bottom sheet has a bottom first edge, a bottom second edge opposite and spaced apart from the bottom first edge, a bottom head edge extending between the bottom first edge and the bottom second edge, a bottom foot edge opposite and spaced apart from the bottom head edge, and a bottom intermediate line extending from the bottom head edge to the bottom foot edge. The bottom intermediate line is disposed between the bottom first side edge and the bottom second side edge. The top sheet is configured to support the patient in use. The top sheet has a top first edge, a top second edge opposite and spaced apart from the top first edge, a top head edge extending between the top first edge and the top second edge, a top foot edge opposite and spaced apart from the top head edge, and a top intermediate line extending from the top head edge to the top foot edge. The top intermediate line is disposed between the top first side edge and the top second side edge. The top intermediate line is coupled to the bottom intermediate line to couple the top sheet to the bottom sheet. The top sheet includes at least one first fastener coupled adjacent to the top first edge and at least one second fastener coupled adjacent to the top second edge. The at least one first fastener is couplable to the at least one second fastener.

The devices disclosed herein can be used to rotate a patient between a supine position and a prone position using fewer nursing staff. This reduces the risk of staff injury during the rotation process.

Unlike existing devices and methods, the patient moves slowly and continuously without rapidly "face-planting" onto the mattress. This provides plenty of time for staff to adjust the patient's equipment and reduces the risk of ventilator or IV lines coming loose.

During use, the patient stays on the sheets of the device during the entire rotation process, so the steps of proning the patient can be reversed to easily return patient to the supine position. Current methods typically cause the patient to be rotated off of the sling onto the mattress during the proning process. Thus, before returning the patient to the supine position, the sling must be placed back under patient again.

The devices disclosed herein can include straps of other couplers adjacent the head of the device which can connect to a device for moving a person on a support apparatus, as described herein. This facilitates the patient's head to be raised above surface of mattress if required by clinical protocol.

FIGS. 14-17I show a device 1400 for rotating a patient 1499 according to another implementation. The device 1400 includes a bottom sheet 1410 and a top sheet 1440.

The bottom sheet 1410 has a first bottom surface 1412 and a second bottom surface 1414 opposite the first bottom surface 1412. The second bottom surface 1414 is configured to abut a top surface of a mattress 1470 or other portion of a bed in use. The bottom sheet 1410 also has a bottom first edge 1420, a bottom second edge 1422 opposite and spaced apart from the bottom first edge 1420, a bottom head edge 1424 extending between the bottom first edge 1420 and the bottom second edge 1422, and a bottom foot edge 1426 opposite and spaced apart from the bottom head edge 1424.

The first bottom surface 1412 has a bottom intermediate line 1428 that extends from the bottom head edge 1424 to the bottom foot edge 1426. The bottom intermediate line 1428 is disposed between the bottom first side edge 1420 and the bottom second side edge 1422 to divide the bottom sheet 1410 lengthwise.

Figure 14:
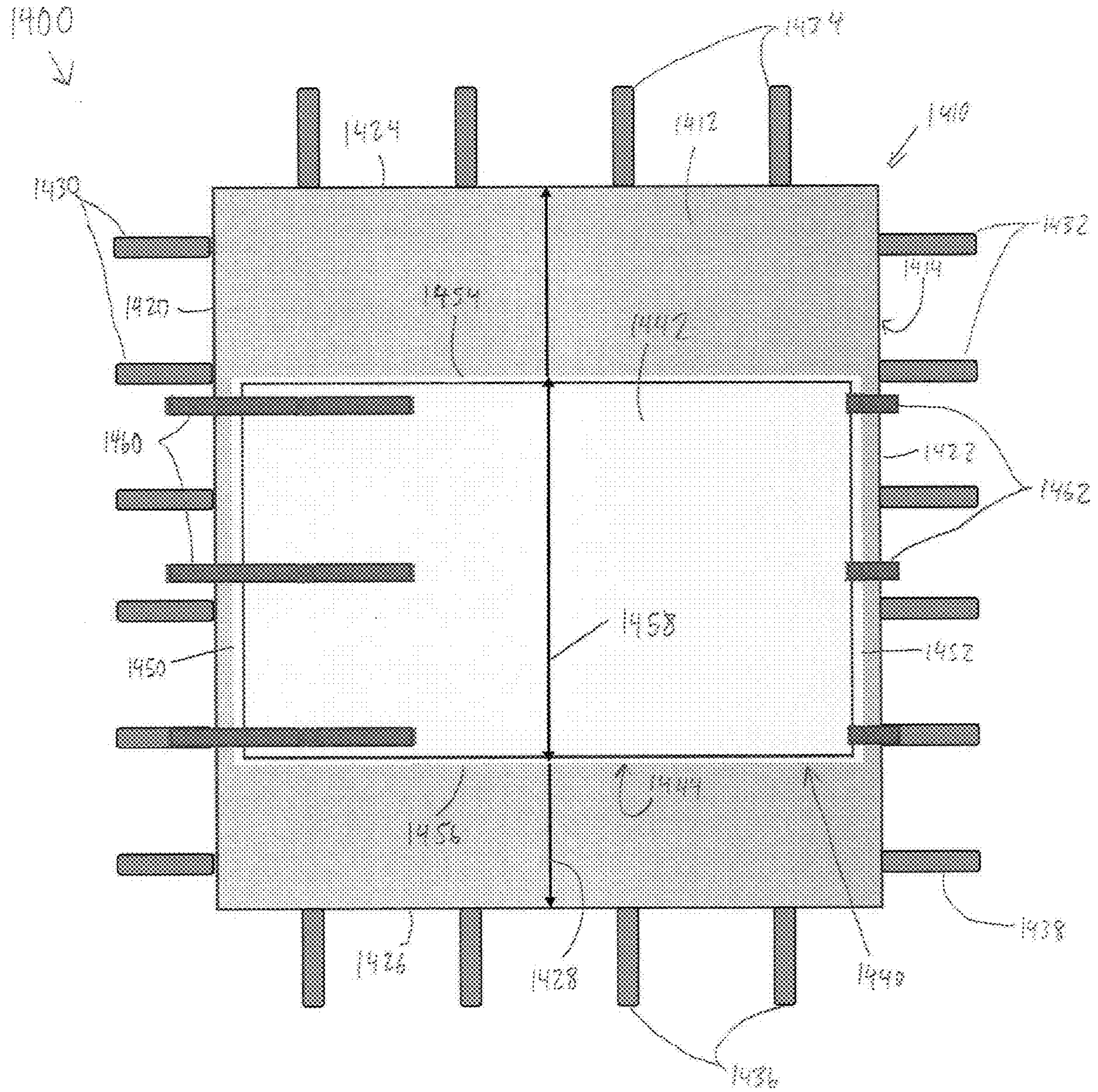
FIG. 14 is a top view of a device for rotating a patient, according to one implementation.
Figure 15A:
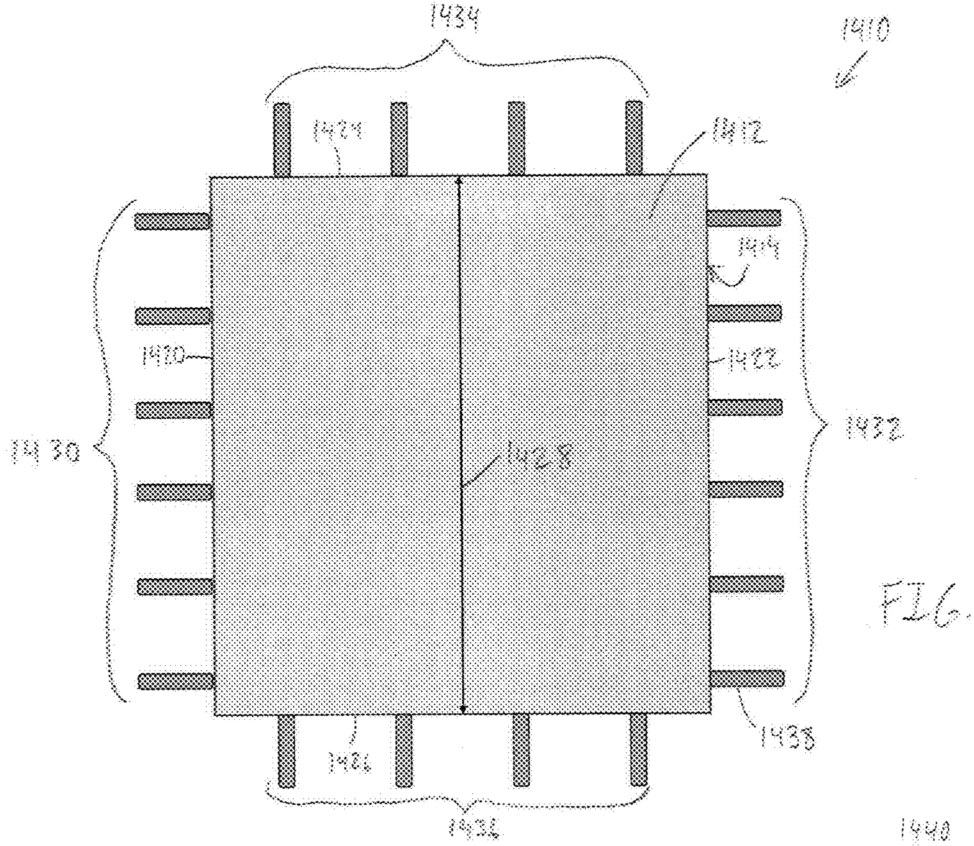
FIG. 15A is a top view of the bottom blanket of the device for rotating a patient of FIG. 14.
Figure 15B:
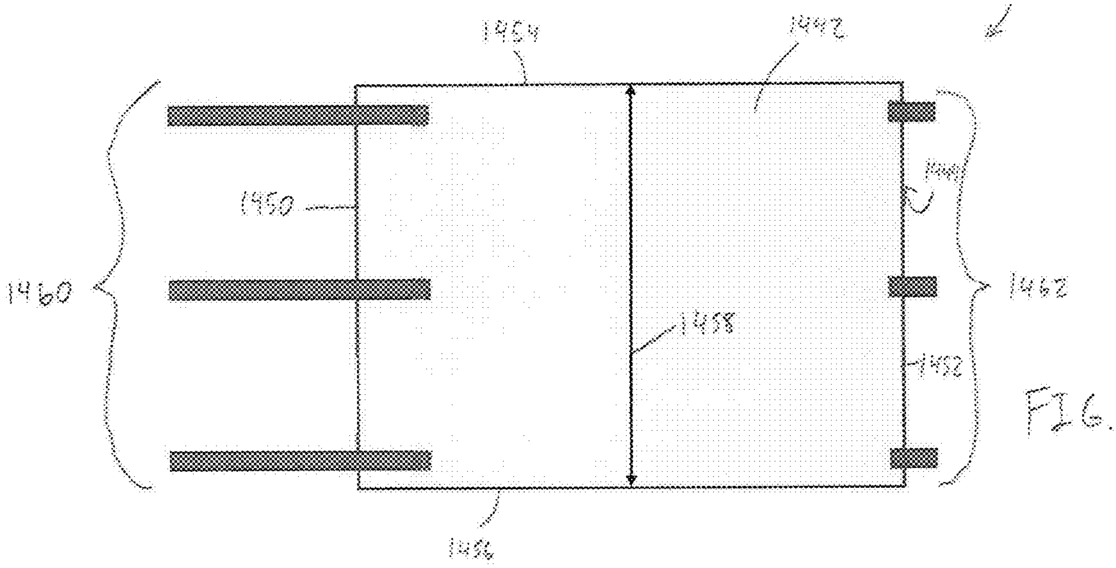
FIG. 15B is a top view of the top blanket of the device for rotating a patient of FIG. 14.

The bottom intermediate line 1428 shown in FIGS. 14-15B is a bottom centerline disposed a substantially equal distance from the bottom first edge 1420 and the bottom second edge 1422.

In some implementations, the bottom sheet is in the range of 50 inches to 80 inches as measured from the bottom first side edge to the bottom second side edge. In some implementations, the bottom sheet is 60 inches as measured from the bottom first side edge to the bottom second side edge. In some implementations, the bottom sheet is in the range of 78 inches to 120 inches as measured from the bottom head edge to the bottom foot edge. In some implementations, the bottom sheet is in the range of 80 inches to 95 inches as measured from the bottom head edge to the bottom foot edge.

The top sheet 1440 has a first top surface 1442 and a second top surface 1444 opposite the first top surface 1442. The first top surface 1442 is configured to support a patient 1499 in use. The top sheet 1440 also has a top first edge 1450, a top second edge 1452 opposite and spaced apart from the top first edge 1450, a top head edge 1454 extending between the top first edge 1450 and the top second edge 1452, and a top foot edge 1456 opposite and spaced apart from the top head edge 1454.

The top sheet 1440 shown in FIGS. 14-17I is shorter than the bottom sheet 1410, but in some implementations, the top sheet is the same length as the bottom sheet. In some implementations, the top sheet is in the range of 35 inches to 80 inches as measured from the top first side edge to the top second side edge. In some implementations, the top sheet is 60 inches as measured from the top first side edge to the top second side edge. In some implementations, the top sheet is in the range of 20 inches to 70 inches as measured from the top head edge to the top foot edge. In some implementations, the top sheet is long enough to extend from the shoulders of a patient to the knees of the patient.

The second top surface 1444 has a top intermediate line 1458 extending from the top head edge 1454 to the top foot edge 1456. The top intermediate line 1458 is disposed between the top first side edge 1450 and the top second side edge 1452 to divide the top sheet 1440 lengthwise.

The top intermediate line 1458 shown in FIGS. 14-15B is a top centerline disposed a substantially equal distance from the top first edge 1450 and the top second edge 1452. However, in some implementations, the top intermediate line, the bottom intermediate line, or both are not centrally located and are offset from the centerline of their respective sheet.

The top intermediate line 1458 is coupled to the bottom intermediate line 1428 to couple the top sheet 1440 to the bottom sheet 1410. As shown in FIGS. 14-15B, the top sheet 1440 is coupled to the bottom sheet 1410 only along the top intermediate line 1458 and the bottom intermediate line 1428. This allows the top first edge 1450 and the top second edge 1452 to move independently of the bottom first edge 1420 and the bottom second edge 1422. The top sheet 1440 shown in FIGS. 14-15B is sewn to the bottom sheet 1410 along the top intermediate line 1458 and the bottom intermediate line 1428, but in some implementations, the top sheet is radio-frequency welded (RF-welded) to the bottom sheet.

The bottom sheet 1410 and the top sheet 1440 shown in FIGS. 14-17I are both made of cotton, but in some implementations, the bottom sheet, the top sheet, or both are made of any breathable synthetic or natural material. In some implementations, the sheets include polyester and/or polypropylene. The bottom sheet 1410 and the top sheet 1440 have a moisture vapor transmission rate of 1,000 g/$m^2$/24 hr. However, in some implementations, the bottom sheet and the top sheet have a moisture vapor transmission rate higher than 1,000 g/$m^2$/24 hr. In some implementations, the bottom sheet and the top sheet have a moisture vapor transmission rate of 800 g/$m^2$/24 hr or higher. In some implementations, the bottom sheet and the top sheet have a moisture vapor transmission rate of 500 g/$m^2$/24 hr or higher. In some implementations, the bottom sheet and the top sheet have a moisture vapor transmission rate of 300 g/$m^2$/24 hr or higher.

As shown in FIGS. 14 and 15B-17I, the top sheet 1440 includes three first fasteners 1460 coupled to the first top surface 1442 adjacent to the top first edge 1450. The top sheet 1440 further includes three second fasteners 1462 coupled adjacent to the top second edge 1452. Each of the the first fasteners 1460 is couplable to a different one of the three second fasteners 1462.

Figure 16A:
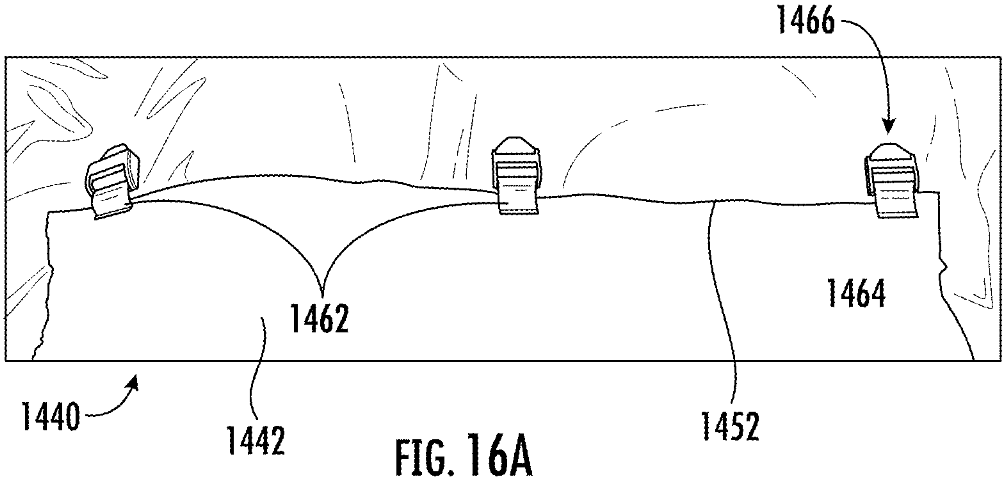
FIG. 16A is a top view of the second fasteners of the top blanket of the device for rotating a patient of FIG. 14.
Figure 16B:
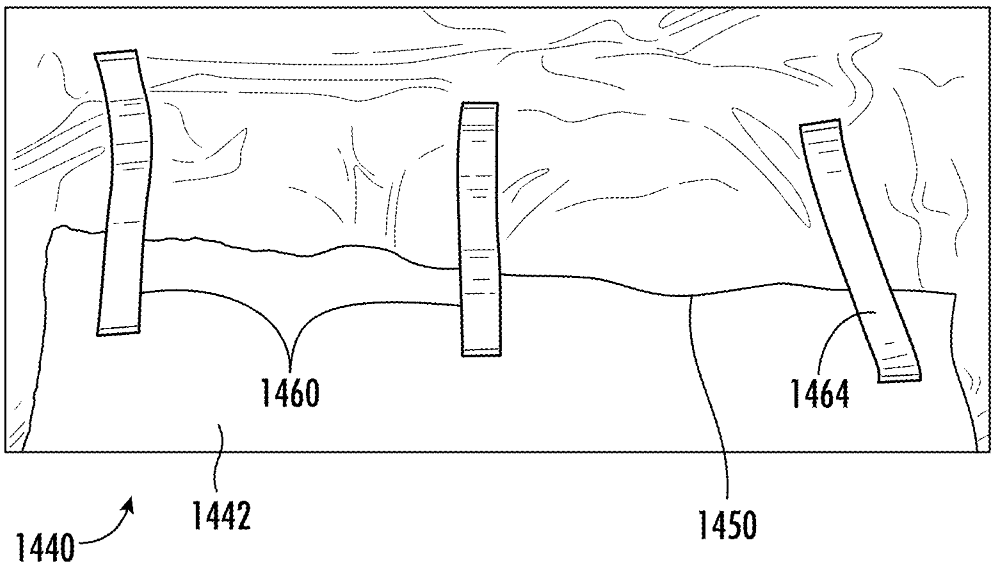
FIG. 16B is a top view of the first fasteners of the top blanket of the device for rotating a patient of FIG. 14.

As shown in FIGS. 16A and 16B, each of the three first fasteners 1460 and the three second fasteners 1462 include a webbing strap 1464 extending away from their respective top edge 1450, 1452 of the top sheet 1440. The webbing straps 1464 of each of the first fasteners 1460 and the second fasteners 1462 has a length in the range of 5 inches to 30 inches. In some implementations, the webbing straps of each of the first fasteners and the second fasteners has a length of 15 inches. The lengths of the webbing straps 1464 of the first fasteners 1460 and the second fasteners 1462 determines the range of patient 1499 circumferences that the device 1400 can accommodate.

Each of the three second fasteners 1462 includes a ladder-lock style buckle 1466 slidably coupled to the webbing strap 1464 of the second fasteners 1462 and configured to accept the webbing strap 1464 of a different one of the first fasteners 1460. The first fasteners 1460 and the second fasteners 1462 are configured such that the patient 1499 is able to access the buckles or clips 1466 of the second fasteners 1462 and/or the first fastener 1460 in both the prone position and the supine position during use.

The ladder-lock style buckles 1466 allow the first fasteners 1460 and second fasteners 1462 to be adjustable in length to change the distance from the first fastener 1460 or second fastener 1462 to the top intermediate line 1458. This allows the user to adjust the tightness of the top sheet 1440 around the patient 1499 in use such that the same top sheet 1440 can be used with different sized patients 1499. In some implementations, the first fasteners and/or the second fasteners can include side-release buckles, hook-and-loops, or other adjustable-length coupling devices.

Although the top sheet 1440 shown in FIGS. 14 and 15B-17I includes three first fasteners 1460 and three second fasteners 1462, in some implementations, the top sheet includes only one first fastener and one second fastener. In some implementations, the top sheet includes two first fastener and two second fastener. In some implementations, the top sheet includes four or more first fastener and four or more second fastener.

The bottom sheet 1410 shown in FIGS. 14, 15A, and 16A-17I includes six first side lifters 1430 extending from or adjacent to the bottom first edge 1420. The bottom sheet 1410 also includes six second side lifters 1432 extending from or adjacent to the bottom second edge 1422. The six first side lifters 1430 and the six second side lifters 1432 include a webbing strap 1438, but in some implementations, the first side lifters and the second side lifters include any mechanism capable of coupling to a lift or other boosting device, as discussed below: In some implementations, the first side lifters and the second side lifters include a cable. In some implementations, the first side lifters and the second side lifters include a cable. In some implementations, the first side lifters and the second side lifters include a carabiner. In some implementations, the first side lifters and the second side lifters include a zipper extending along the bottom first edge or the bottom second edge.

Although the bottom sheet 1410 shown in FIGS. 14, 15A, and 16A-17I includes six first side lifters 1430 and the six second side lifters 1432, in some implementations, the bottom sheet includes any number of one or more first side lifters and any number of one or more second side lifters. For example, in some implementations, the bottom sheet only includes one or more first side lifters or any number of one or more second side lifters.

The bottom sheet 1410 shown in FIGS. 14, 15A, and 16A-17I further includes four head lifters 1434 and four foot lifters 1436. The four head lifters 1434 and the four foot lifters 1436 include a webbing strap 1438, but in some implementations, the head lifters and the foot lifters include any mechanism capable of coupling to a lift or other boosting device, as discussed below: In some implementations, the head lifters and the foot lifters include a cable. In some implementations, the head lifters and the foot lifters include a cable. In some implementations, the head lifters and the foot lifters include a carabiner. In some implementations, the head lifters and the foot lifters include a zipper. In some implementations, the head lifters and the foot lifters are spaced apart from each other by a distance in the range of 8 inches to 26 inches.

Figure 17A:
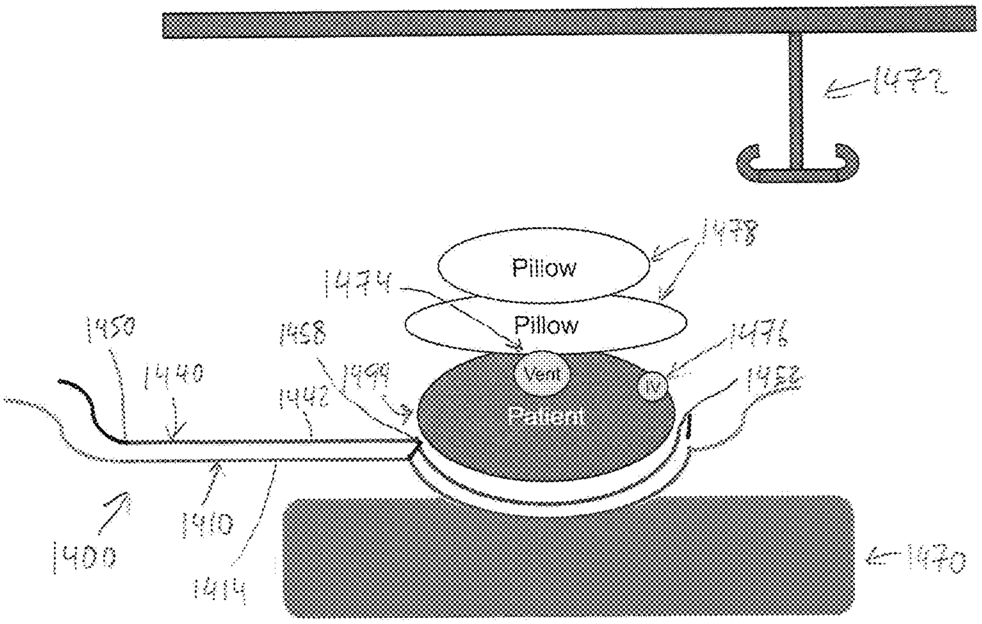
FIGS. 17A-17I are end views the device for rotating a patient of FIG. 14 in use.

FIGS. 17A-17I show the device of FIGS. 14-16B in use. As shown in FIG. 17A, the bottom sheet 1410 is positioned on the mattress 1470 of the bed such that the second bottom surface 1414 abuts the mattress 1470. The top sheet 1440 is disposed on the bottom sheet 1410, and the patient 1499 is disposed on the top sheet 1440 in the supine position such that the patient's back 1499 abuts the first top surface 1442. The patient 1499 is disposed on a portion of the top sheet 1440 between the top intermediate line 1458 and the top second edge 1452 with the patient's head and feet 1499 extending beyond the top head edge 1454 and the top foot edge 1456, respectively. The ventilator 1474 and IV line 1476 of the patient 1499 are placed on the chest of the patient 1499. And two pillows 1478 can be placed on the ventilator 1474 to provide a cushion for the patient 1499 during rotation.

Figure 17B:
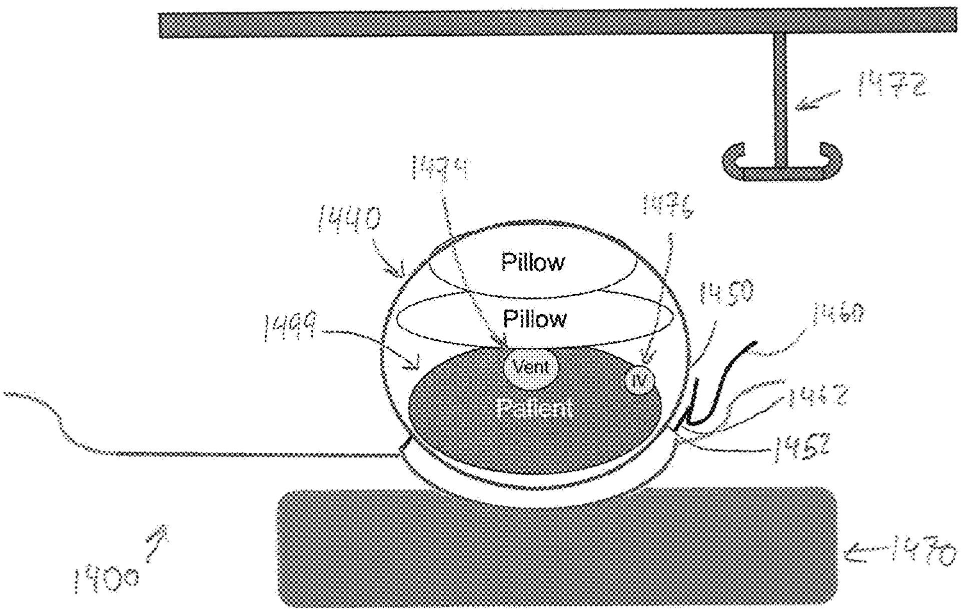

As shown in FIG. 17B, the top first edge 1450 is then moved over the patient 1499 such that the top first edge 1450 is adjacent the top second edge 1452. Each of the first fasteners 1460 are coupled to a different one of the second fasteners 1462. The first fasteners 1460 and the second fasteners 1462 are tightened to secure the top sheet 1440 around the patient 1499. In this position, the top sheet 1440 also secures the IV line 1476 and the ventilator 1474.

Figure 17C:
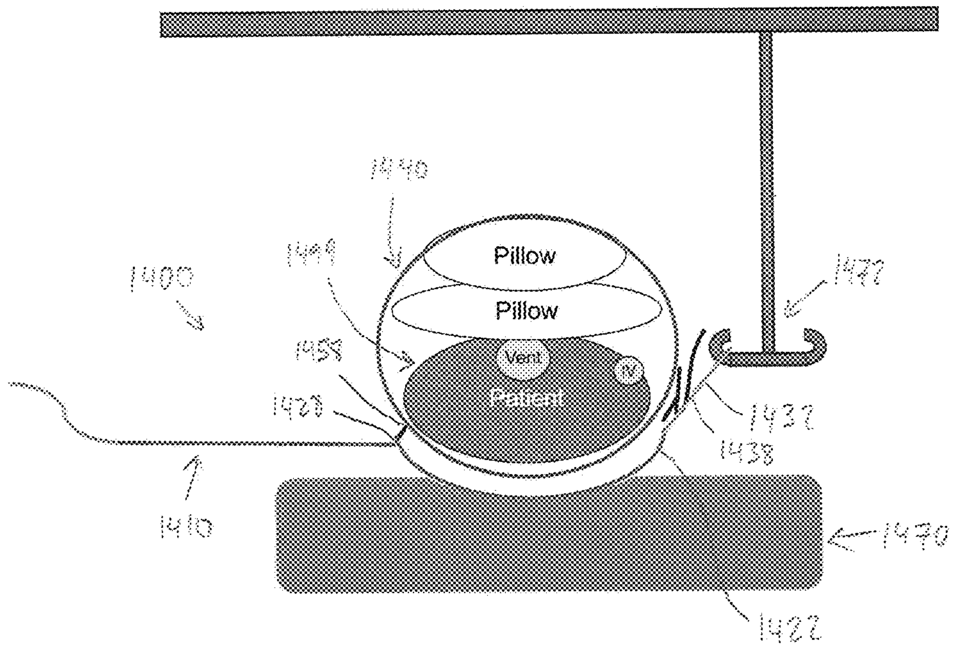

FIG. 17C shows the second side lifters 1432 coupled to a ceiling lift 1472. The second side lifters 1432 shown in the figures include a wedding strap 1438 loop that can be hooked onto the ceiling lift 1472. Thus, the bottom second edge 1422 is coupled to the ceiling lift 1472. The top sheet 1440 is only coupled to the ceiling lift 1472 via the bottom sheet 1410 via the coupling of the top intermediate line 1458 and the bottom intermediate line 1428.

Figure 17D:
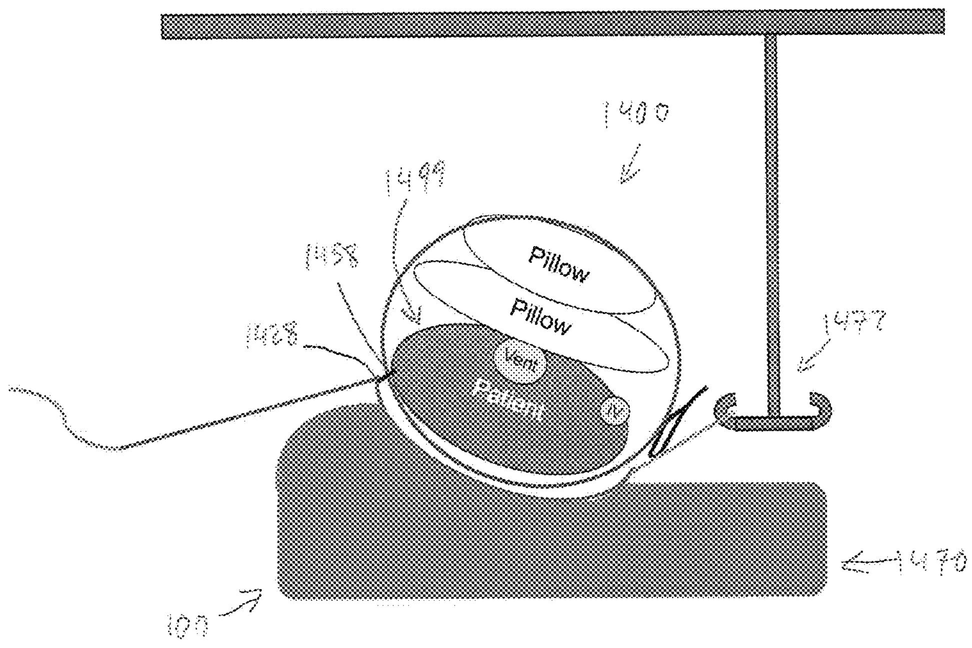

In some implementations, the bed includes a device 100 for moving a person on a support apparatus, such as those described herein. The device 100 is disposed such that, when actuated as shown in FIG. 17D, the device 100 causes the top surface of the mattress 1470 to be raised adjacent or under the top intermediate line 1458 and bottom intermediate line 1428, causing the side of the patient 1499 opposite the ceiling lift 1472 to be elevated.

Figure 17E:
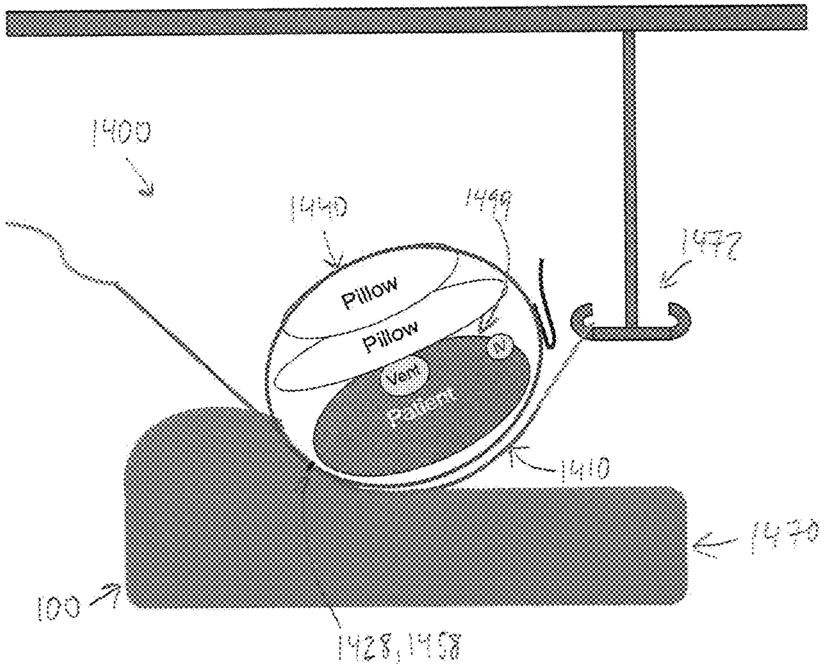
Figure 17F:
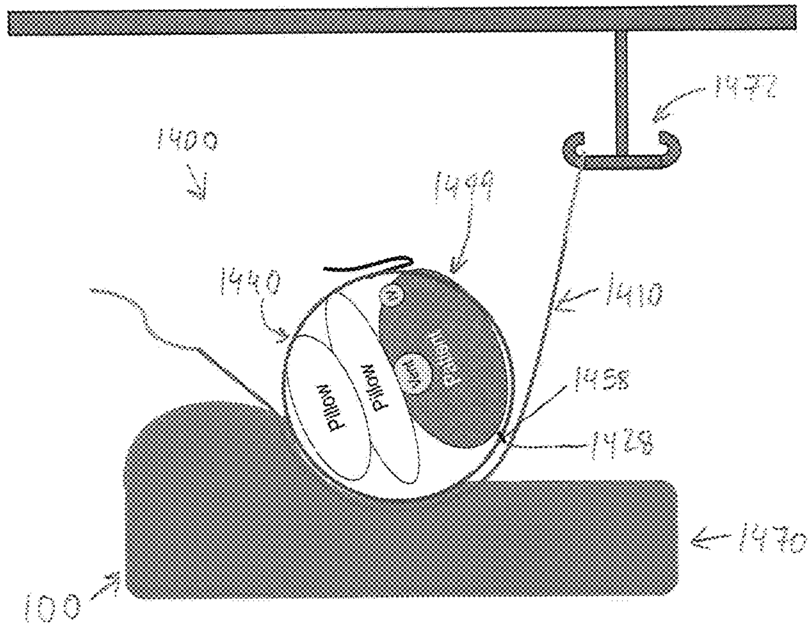

The ceiling lift 1472 is then raised, as shown in FIGS. 17E and 17F. The lifting of the ceiling lift 1472 pulls the bottom sheet 1410 upwards. Because the top sheet 1440 is coupled to the bottom sheet 1410 only along the intermediate lines 1428, 1458, and the bottom intermediate line 1428 is being pulled under the patient 1499, the top intermediate line 1458 is also moved under the patient 1499 toward the ceiling lift 1472 side of the patient 1499. This causes the top sheet 1440 and the patient 1499 to begin to rotate toward the device 100 for moving a person on a support apparatus. Because the device 100 has caused a portion of the top surface of the mattress 1470 opposite the ceiling lift 1472 to be raised, the raised portion prevents the patient 1499 from rolling away from the ceiling lift 1472. Thus, the patient 1499 is rotated in place.

Figure 17G:
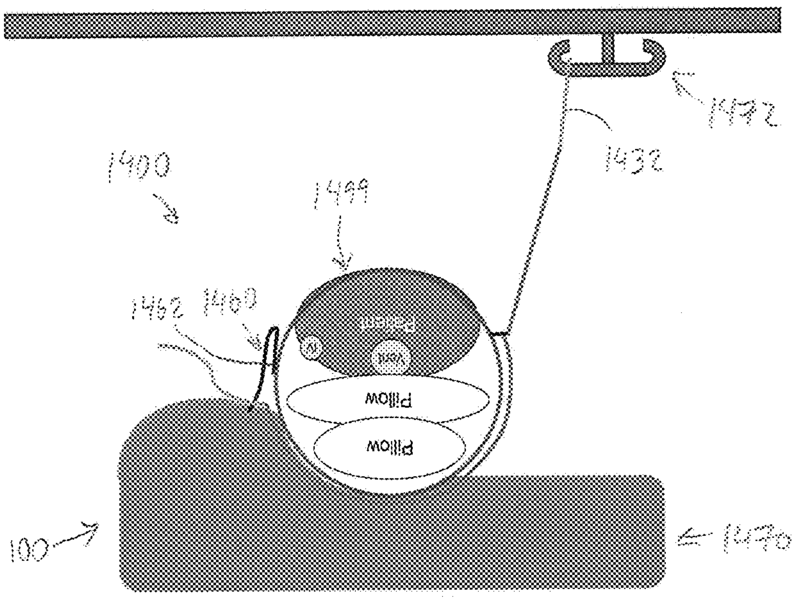
Figure 17H:
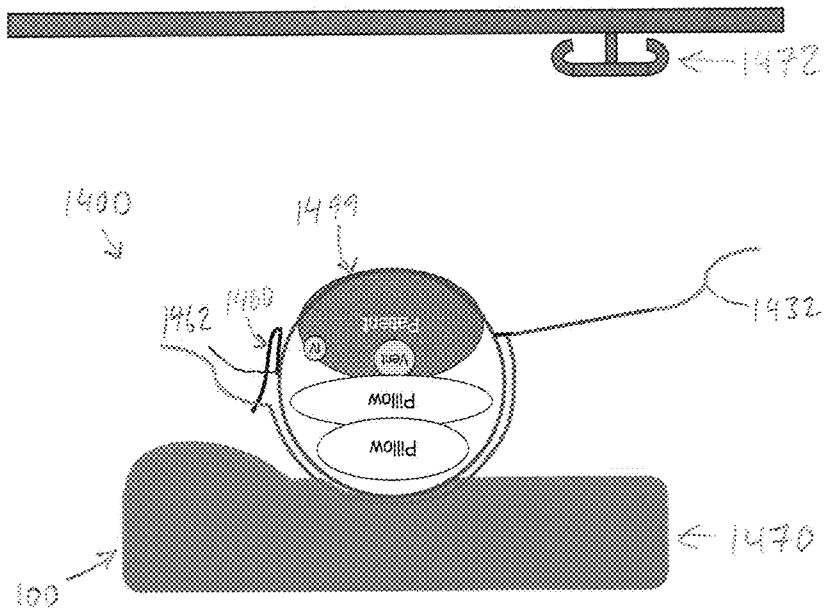
Figure 17I:
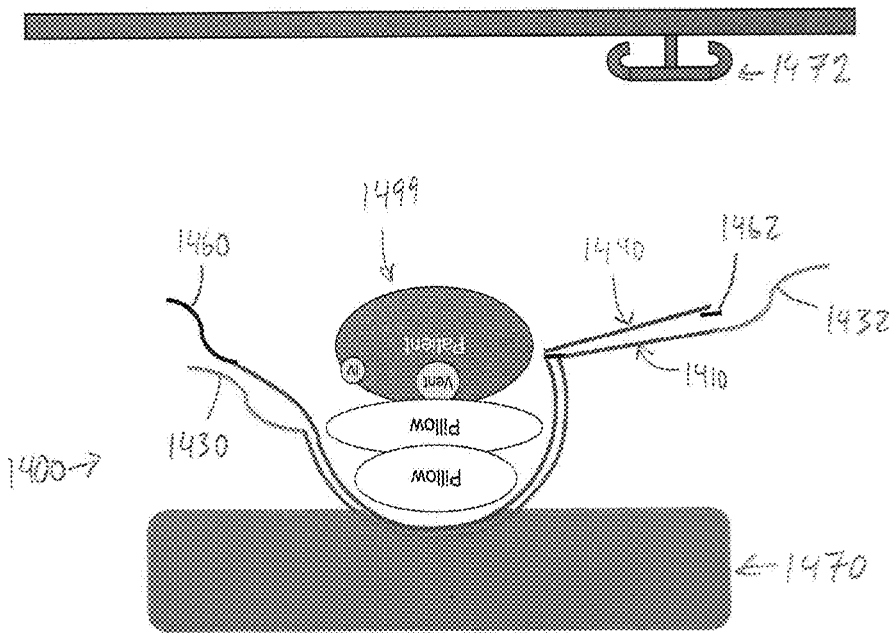

As shown in FIG. 17G, once the patient 1499 has been rotated 180 degrees from the supine position to the prone position, the ceiling lift 1472 is stopped from raising further. The second side lifters 1432 can then be decoupled from the ceiling lifter 1472, as shown in FIG. 17H. The device 100 for moving a person on a support apparatus can be deactivated to lower the portion of the top of the mattress 1470 back to its original position, and the first fasteners 1460 can be uncoupled from the second fasteners 1462, as shown in FIG. 17I.

The sheets 1410, 1440 can then be removed from on top of the patient 1499 such that the patient 1499 is in the prone position without any sheets 1410, 1440 covering the patient 1499.

To rotate the patient 1499 back to the supine position, the first fasteners 1460 are recoupled to the second fasteners 1462, the first side lifters 1430 are coupled to the ceiling lift 1472, a second device 100 for moving a person on a support apparatus is actuated to elevate a portion of the top of the mattress 1470 on the opposite side of the patient 1499 as before, and the ceiling lift 1472 is again raised. Similar to before, the raising of the ceiling lift 1472 causes the patient 1499 to rotate in the opposite direction this time to return the patient 1499 to the supine position.

The head lifters 1434 and the foot lifters 1436 can also be coupled to a ceiling lift 1472 or to a device 100 for moving a person on a support apparatus. The devices 100 for moving a person on a support apparatus described herein can be coupled adjacent the head end of the mattress 1470 to aid in boosting a patient 1499 in bed. The head lifters 1434 can be coupled to a device 100 for moving a person on a support apparatus that is coupled adjacent the head of the bed such that actuation of the device 100 causes the bottom sheet 1410, the top sheet 1440, and the patient 1499 to move toward the head of the bed.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A device for rotating a patient, the device comprising:

a bottom sheet configured to abut a surface of a bed in use, the bottom sheet having a bottom first edge, a bottom second edge opposite and spaced apart from the bottom first edge, a bottom head edge extending between the bottom first edge and the bottom second edge, a bottom foot edge opposite and spaced apart from the bottom head edge, and a bottom intermediate line extending from the bottom head edge to the bottom foot edge, the bottom intermediate line being disposed between the bottom first side edge and the bottom second side edge; and a top sheet configured to support the patient in use, the top sheet having a top first edge, a top second edge opposite and spaced apart from the top first edge, a top head edge extending between the top first edge and the top second edge, a top foot edge opposite and spaced apart from the top head edge, and a top intermediate line extending from the top head edge to the top foot edge, the top intermediate line being disposed between the top first side edge and the top second side edge, wherein the top intermediate line is coupled to the bottom intermediate line to couple the top sheet to the bottom sheet, wherein the top sheet includes at least one first fastener coupled adjacent to the top first edge and at least one second fastener coupled adjacent to the top second edge, wherein the at least one first fastener is couplable to the at least one second fastener, and wherein the top sheet is coupled to the bottom sheet only along the top intermediate line and the bottom intermediate line.

2. The device of claim 1, wherein the top sheet is sewn to the bottom sheet.

3. The device of claim 1, wherein the top sheet is radio-frequency welded (RF-welded) to the bottom sheet.

4. The device of claim 1, wherein the top intermediate line is a top centerline disposed a substantially equal distance from the top first edge and the top second edge.

5. The device of claim 1, wherein the bottom intermediate line is a bottom centerline disposed a substantially equal distance from the bottom first edge and the bottom second edge.

6. The device of claim 1, wherein the bottom sheet includes at least one side lifter, wherein the at least one side lifter extends adjacent to the bottom first edge.

7. The device of claim 6, wherein the at least one side lifter comprises a webbing strap.

8. The device of claim 6, wherein the at least one side lifter comprises at least two side lifters.

9. The device of claim 6, wherein the at least one side lifter is at least one first side lifter, wherein the bottom sheet further includes at least one second side lifter extending adjacent to the bottom second edge.

10. The device of claim 9, wherein the at least one second side lifter comprises at least two second side lifters.

11. The device of claim 6, wherein the bottom sheet further includes at least one head lifter.

12. The device of claim 6, wherein the bottom sheet further includes at least one foot lifter.

13. The device of claim 1, wherein one of the at least one first fastener or the at least one second fastener comprises a webbing strap.

14. The device of claim 1, wherein one of the at least one first fastener or the at least one second fastener is adjustable to change the distance from the one of the at least one first fastener or the at least one second fastener to the top intermediate line.

15. The device of claim 1, wherein the at least one first fastener or the at least one second fastener each comprise ladder-lock style buckles.

16. The device of claim 1, wherein the at least one first fastener comprises at least two first fasteners and the at least one second fastener comprises at least two second fasteners.

17. The device of claim 15, wherein the at least two first fastener comprises at least three first fasteners and the at least two second fastener comprises at least three second fasteners.

18. The device of claim 1, wherein the top sheet has a first top surface and a second top surface opposite and spaced apart from the first top surface, wherein the second top surface is coupled to the bottom sheet, wherein the at least one first fastener is coupled to the first top surface adjacent the top first edge.

19. The device of claim 1, wherein the bottom sheet and the top sheet each comprise cotton.

* * * * *